United States Patent
Naskar et al.

(10) Patent No.: US 10,985,372 B2
(45) Date of Patent: Apr. 20, 2021

(54) PYROLYTIC CARBON BLACK COMPOSITE AND METHOD OF MAKING THE SAME

(71) Applicant: UT-Battelle, LLC, Oak Ridge, TN (US)

(72) Inventors: Amit K. Naskar, Knoxville, TN (US); Mariappan Parans Paranthaman, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 16/404,362

(22) Filed: May 6, 2019

(65) Prior Publication Data
US 2019/0260026 A1   Aug. 22, 2019

Related U.S. Application Data

(60) Division of application No. 15/056,184, filed on Feb. 29, 2016, now Pat. No. 10,320,000, which is a
(Continued)

(51) Int. Cl.
*H01M 4/1393* (2010.01)
*H01M 4/133* (2010.01)
(Continued)

(52) U.S. Cl.
CPC .............. *H01M 4/587* (2013.01); *C09C 1/48* (2013.01); *C09C 1/482* (2013.01);
(Continued)

(58) Field of Classification Search
CPC .... H01M 4/587; H01M 4/133; H01M 4/1393; H01M 2004/027; B82Y 30/00; C09C 1/482
(Continued)

(56) References Cited

U.S. PATENT DOCUMENTS 3,823,221 A   7/1974   Wakefield et al.
3,886,088 A   5/1975   DeJong
(Continued)

FOREIGN PATENT DOCUMENTS

CA   2908768 A1   4/2017
CN   101003695 A   7/2007
(Continued)

OTHER PUBLICATIONS

J. Xu et al.: "Hierarchical Nanocomposites of Polyaniline Nanowire Arrays on Graphene Oxide Sheets with Synergistic Effect for Energy Storage", ACS Nano, 2010, 4, 5019-5026.
(Continued)

*Primary Examiner* — Khanh T Nguyen
(74) *Attorney, Agent, or Firm* — Fox Rothschild LLP

(57) ABSTRACT

A method of recovering carbon black includes the step of providing a carbonaceous source material containing carbon black. The carbonaceous source material is contacted with a sulfonation bath to produce a sulfonated material. The sulfonated material is pyrolyzed to produce a carbon black containing product comprising a glassy carbon matrix phase having carbon black dispersed therein. The pyrolysis can be conducted at a temperature from 1100° C. to 1490° C. A method of making a battery electrode and a lithium ion or sodium ion battery is also disclosed.

9 Claims, 17 Drawing Sheets

Related U.S. Application Data continuation-in-part of application No. 13/945,239, filed on Jul. 18, 2013, now Pat. No. 9,441,113.

(51) Int. Cl.
| | |
|---|---|
| *C09C 1/48* | (2006.01) |
| *H01M 4/587* | (2010.01) |
| *H01M 10/0525* | (2010.01) |
| *H01M 10/054* | (2010.01) |
| *H01M 4/04* | (2006.01) |
| *H01M 4/02* | (2006.01) |
| *H01M 10/052* | (2010.01) |

(52) U.S. Cl.
CPC ......... *H01M 4/0471* (2013.01); *H01M 4/133* (2013.01); *H01M 4/1393* (2013.01); *H01M 10/054* (2013.01); *H01M 10/0525* (2013.01); *C01P 2004/04* (2013.01); *C01P 2006/12* (2013.01); *C01P 2006/40* (2013.01); *H01M 10/052* (2013.01); *H01M 2004/027* (2013.01)

(58) Field of Classification Search
USPC .......................................... 429/188; 205/555
See application file for complete search history.

(56) References Cited

U.S. PATENT DOCUMENTS

| | | | |
|---|---|---|---|
| 4,002,587 A | 1/1977 | Watanabe et al. | |
| 4,284,616 A | 8/1981 | Solbakken et al. | |
| 5,728,361 A | 3/1998 | Holley | |
| 5,744,668 A | 4/1998 | Zhou et al. | |
| 5,961,946 A | 10/1999 | Takegawa et al. | |
| 5,965,479 A | 10/1999 | Suzuki et al. | |
| 6,297,293 B1 | 10/2001 | Bell et al. | |
| 6,448,307 B1 | 9/2002 | Medoff et al. | |
| 6,547,710 B1 | 4/2003 | Patel et al. | |
| 6,737,445 B2 | 5/2004 | Bell et al. | |
| 6,802,897 B1 | 10/2004 | Lackey et al. | |
| 6,919,063 B2 | 7/2005 | Jang et al. | |
| 7,416,641 B2 | 8/2008 | Denison | |
| 7,497,929 B2 | 3/2009 | Karpetsky et al. | |
| 7,947,248 B2 | 5/2011 | Hamby et al. | |
| 7,993,780 B2 * | 8/2011 | Jang ....................... | B82Y 30/00 205/555 |
| 8,013,130 B2 | 9/2011 | Yanagawa et al. | |
| 8,575,281 B2 | 11/2013 | Yanagawa et al. | |
| 9,441,113 B2 | 9/2016 | Naskar et al. | |
| 2002/0065333 A1 | 5/2002 | Bell et al. | |
| 2002/0114126 A1 | 8/2002 | Hirahara et al. | |
| 2005/0058822 A1 | 3/2005 | Ittel | |
| 2008/0206541 A1 | 8/2008 | Medoff | |
| 2008/0227996 A1 | 9/2008 | Hara et al. | |
| 2009/0136849 A1 | 5/2009 | Yue et al. | |
| 2010/0008021 A1 | 1/2010 | Hu et al. | |
| 2010/0261051 A1 * | 10/2010 | Okada ................... | H01M 4/587 429/188 |
| 2011/0255214 A1 | 10/2011 | Gruner et al. | |
| 2011/0275011 A1 | 11/2011 | Zhu et al. | |
| 2012/0026643 A1 | 2/2012 | Yu et al. | |
| 2012/0045688 A1 | 2/2012 | Liu et al. | |
| 2012/0263641 A1 | 10/2012 | Chung et al. | |
| 2014/0038034 A1 | 2/2014 | Rios et al. | |
| 2014/0371385 A1 | 12/2014 | Verberne et al. | |
| 2015/0017528 A1 | 1/2015 | Roberts et al. | |
| 2015/0021525 A1 | 1/2015 | Naskar et al. | |
| 2015/0221947 A1 | 8/2015 | Ono et al. | |
| 2016/0254543 A1 | 9/2016 | Naskar et al. | |
| 2016/0351346 A1 | 12/2016 | Naskar et al. | |

FOREIGN PATENT DOCUMENTS

| | | |
|---|---|---|
| CN | 102214516 A | 10/2011 |
| FR | 2357616 A1 | 2/1978 |
| KR | 101147788 B1 | 5/2012 |
| WO | 200129150 | 4/2001 |
| WO | 2011010323 A1 | 1/2011 |
| WO | 2014162267 A1 | 10/2014 |

OTHER PUBLICATIONS

H.-P. Cong et al.: "Flexible graphene-polyaniline composite paper for high-performance supercapacitor", Energy Environ. Sci., 2013, 6, 1185.

Y. Zhou et al.: "Polyaniline/multi-walled carbon nanotube composites with core-shell structures as supercapacitor electrode materials", Electrochim. Acta, 2010, 55, 3904-3908.

X. Xia et. al.: "Reduced-graphene oxide/molybdenum oxide/polyaniline ternary composite for high energy density supercapacitors: Synthesis and properties" J. Mater. Chem., 2012, 22, 8314.

K. B. Hatzell et al.:"Composite Manganese Oxide Percolating Networks as a Suspension Electrode for an Asymmetric Flow Capacitor", ACS Appl. Mater. Interfaces, 2014, 6, 8886-8893.

Q. Wu et al.: "Supercapacitors Based on Flexible Graphene/Polyaniline Nanofiber Composite Films" ACS Nano, 2010, 4, 1963-1970.

Z. Lei et al.: "Growth of Polyaniline on Hollow Carbon Spheres for Enhancing Electrocapacitance", J. Phys. Chem. C, 2010, 114, 19867-19874.

X. Wang et al.: Crosslinked polyaniline nanorods with improved electrochemical performance as electrode material for supercapacitors, J. Mater. Chem. A, 2014, 2, 12323.

C. Xia et al.: "Highly Stable Supercapacitors with Conducting Polymer Core-Shell electrodes for Energy Storage Applications", Adv. Energy Mater, 2015.

L. Wang et al.: "Hierarchical Nanocomposites of Polyaniline Nanowire Arrays on Reduced Graphene Oxide Sheets for Supercapacitors" Sci. Rep., 2013, 3, 3568.

A. Du Pasquier et al.: "Li4Ti5O12/poly(methyl)thiophene asymmetric hybrid electrochemical device" J. Power Sources, 2004, 125, 95-102.

J. S. Lee et al.: "A metal-oxide nano?ber-decorated three dimensional graphene hybrid nanostructured ?exible electrode for high-capacity electrochemical capacitors", J. Mater. Chem. A, 2014, 2, 11922.

R. B. Rakhi et al.: "Conducting polymer/carbon nanocoil composite electrodes for efficient supercapacitors", J. Mater. Chem., 2012, 22, 5177.

Huang et al, 'Pyrolysis treatment of waste tire powder in a capacitively coupled RF plasma reactor', Energy Conversion and Management, vol. 50, Dec. 21, 2008, p. 611-617.

Wen et al, 'Expanded graphite as superior anode for sodium-ion batteries', Nature Communications, vol. 5, article 4003, Jun. 4, 2014 (Apr. 6, 2014), p. 1-10.

Li et al, 'Amorphous monodispersed hard carbon micro-spherules derived from biomass as a high performance negative electrode material for sodium-ion batteries', Journal of Materials Chemistry A, vol. 3, Oct. 23, 2014 (Oct. 23, 2014), p. 71-77.

Ariyadejwanich et al, "Preparation and characterization of mesoporous activated carbon from waste tires", Carbon, vol. 41, issue 1, Oct. 25, 2002 (Oct. 25, 2002), p. 157-164.

Hummers et al., "Preparation of graphitic oxide", J Am Chem Soc (1958) 80(6): 1339.

Lin et al., "Surface functional characteristics (C, 0, S) of waste tire-derived carbon black before and after steam activation", J Atr & Waste Manage. Assoc. (2008) 58: 78-84.

Tang et al., "Thermal plasma pyrolysis of used tires for carbon black recovery", Journal of Materials Science (2005) 40(14): 3817-3819.

Wojtowicz et al., "Carbon black derived from waste tire pyrolysis", Advanced Fuel Research, Inc. (n.d.). (7 pages).

Shu et al.: "Synthesis of biodiesel from waste vegetable oil with large amounts of free fatty acids using a carbon-based solid acid catalyst", J. Applied Energy 2010, 87, 2589.

Canakci et al.: "Biodiesel Production From Oils and Fats With High Free Fatty Acids", Transactions-American Society of Agricultural Engineers 2001, 44, 1429.

(56) References Cited

OTHER PUBLICATIONS

Ma et al.: "Biodiesel production: a review", Bioresource technology 1999, 70, 1.
Peng et al.: "Biodiesel production from waste oil feedstocks by solid acid catalysis", Process Safety and Environmental Protection 2008, 86, 441.
Boota et al.: "Waste Tire Derived Carbon-Polymer Composite Paper as Pseudocapacitive Electrode with Long Cycle Life", ChemSusChem 2015, 8, 3576.
Naskar et al.: "Tailored recovery of carbons from waste tires for enhanced performance as anodes in lithium-ion batteries", RSC Advances 2014, 4, 38213.
Zhi et al.: "Effects of Pore Structure on Performance of an Activated-Carbon Supercapacitor Electrode Recycled from Scrap Waste Tires", ACS Sustainable Chemistry & Engineering 2014, 2, 1592.
Chen et al.: "Gold Nanocages: Bioconjugation and Their Potential Use as Optical Imaging Contrast Agents", Nano letters 2005, 5, 473.
Deshmane et al.: "A comparative study of solid carbon acid catalysts for the esterification of free fatty acids for biodiesel production. Evidence for the leaching of colloidal carbon", Bioresource technology 2013, 147, 597.
Toda et al.: "Green chemistry: Biodiesel made with sugar catalyst", Nature 2005, 438, 178.
Shu et al.: "Synthesis of biodiesel from cottonseed oil and methanol using a carbon-based solid acid catalyst", Fuel Processing Technology 2009, 90, 1002.
Jacobson et al.: "Solid acid catalyzed biodiesel production from waste cooking oil" Applied Catalysis B: Environmental 2008, 85, 86.
Sani, Y. et al.:"Activity of solid acid catalysts for biodiesel production: A critical review", Applied Catalysis A: General 2014, 470, 140.
"Biochar based solid acid catalyst for biodiesel production," Amir Mehdi Dehkhoda et al. Applied Catalysis A: General 382 (2010), pp. 197-204.
"New sulfonic acid ion-exchange resins for the preesterification of different oils and fats with high content of free fatty acids," Bernhard M. E. Russbueldt, et al. Applied Catalysis A: General 362 (2009), pp. 47-57.
Zhi et al.: "Effects of Pore Structure on Performance of an Activated-Carbon Supercapacitor Electrode Recycled from Scrap Waste Tires", ACS Sustainable Chem. Eng. 2014, 2, 1592?1598.
J. Voelcker, Green Car Reports, 2014.
San Miguel et al. "Pyrolysis of Tire Rubber: Porosity and Adsorption Characteristics of the Pyrolytic Chars",, Ind. Eng. Chem. Res 2006, 37, 2430-2435.
A. Quek et. al: "Liquefaction of waste tires by pyrolysis for oil and chemicals—A review", J. Anal. Appl. Pyrolysis, 2013, 101, 1-16.
F. Béguin et al.: "Carbons and Electrolytes for Advanced Supercapacitors", Adv. Mater., 2014, 26, 2219-2251.
P. Simon et al.: "Charge storage mechanism in nanoporous", Trans. A. Math. Phys. Eng. Sci., 2010, 368, 3457-3467.
M.-M. Titirici, et al.: "Sustainable carbon materials", Chem. Soc. Rev., 2015, 44, 250-290.
E. M. Lotfabad et al.: "High-Density Sodium and Lithium Ion Battery Anodes from Banana Peels", ACS Nano, 2014, 8, 7115-7129.
H. Wang et al.: "Interconnected Carbon Nanosheets Derived from Hemp for Ultrafast Supercapacitors with High Energy", ACS Nano, 2013, 7, 5131-41.
J. Jiang et al: "Evolution of disposable bamboo chopsticks into uniform carbon ?bers: a smart strategy to fabricate sustainable anodes for Li-ion batteries", Energy Environ. Sci., 2014, 7, 2670-2679.
L.-F. Chen et al.: "Flexible all-solid-state high-power supercapacitor fabricated with nitrogen-doped carbon nano?ber electrode material derived from bacterial cellulose", Energy Environ. Sci., 2013, 6, 3331.
M. Biswal et al.: "From dead leaves to high energy density supercapacitors", Energy Environ. Sci., 2013, 6, 1249.
P. Chen et al.: "Nitrogen-doped nanoporous carbon nanosheets derived from plant biomass: an efficient catalyst for oxygen reduction reaction", Energy Environ. Sci., 2014, 7, 4095-4103.
W. Qian et al.: "Human hair-derived carbon ?akes for electrochemical supercapacitors", Energy Environ. Sci., 2013, 379-386.
J. Ding et al.: "Peanut shell hybrid sodium ion capacitor with extreme energy-power rivals lithium ion capacitors", Energy Environ. Sci., 2015, 8, 941-955.
J. Zhang et al.: "On the Configuration of Supercapacitors for Maximizing Electrochemical Performance", ChemSusChem, 2012, 5, 818-41.
T. Liu et al.: "Polyaniline and Polypyrrole Pseudocapacitor Electrodes with Excellent Cycling Stability", Nano Lett., 2014, 14, 2522-2527.
G. Wang et al. "A review of electrode materials for electrochemical supercapacitors", Chem. Soc. Rev., 2012, 41, 797.
A. K. Naskar et al.: "Tailored recovery of carbons from waste tires for enhanced performance as anodes in lithium-ion batteries", RSC Adv., 2014, 4, 38213.
L. Wei et al.: "Hydrothermal Carbonization of Abundant Renewable Natural Organic Chemicals for High-Performance Supercapacitor Electrodes", Adv. Energy Mater., 2011, 1, 356-361.
J. Huang et al: "Nanofiber Formation in the Chemical Polymerization of Aniline: A Mechanistic Study". Chemie—Int. Ed., 2004, 43, 5817-5821.
M. Boota et al.: "Towards High-Energy-Density Pseudocapacitive Flowable Electrodes by the Incorporation of Hydroquinone" ChemSusChem, 2015, 8, 835-843.
K. B. Hatzell et al.: "Effect of Oxidation of Carbon Material on Suspension Electrodes for Flow Electrode Capacitive Deionization", Environ. Sci. Technol., 2015, 150211062348002.
M. Boota, et al.: "Graphene-containing flowable electrodes for capacitive energy storage" Carbon N. Y., 2015, 92, 142-149.
C. Zhang et al: "Highlyporouscarbonspheresforelectrochemicalcapacitorsandcapacitiveflowablesuspensionelectrodes", Carbon N. Y., 2014, 77, 155-164.
M. Tagowska et al.: "Polyaniline nanotubules-anion effect on conformation and oxidation state of polyaniline studied by Raman Spectroscopy", Synth. Met., 2004, 142, 223-229.
S. Sharma et al.: "Chloroform vapour sensor based on copperlpolyaniline nanocomposite", Sensors Actuators, B Chem., 2002, 85, 131-136.
M. A. Islam et al.: "Mesoporous and adsorptive properties of palm date seed activated carbon prepared via sequential hydrothermal carbonization and sodium hydroxide activation", Chem. Eng. J., 2015, 270, 187-195.
M. Boota et al.: "Activated Carbon Spheres as a Flowable Electrode in Electrochemical Flow Capacitors", Electrochem Soc., 2014, 161, A1078-A1083.
K. B. Flatzell et al.: "Flowable Conducting Particle Networks in Redox-Active Electrolytes for Grid Energy Storage", J. Electrochem. Soc., 2015, 162, A5007-A5012.
Gnanaraj, "Sustainable Waste Tire Derived Carbon Material as a Potential Anode for Lithium Ion Batteries"; Sustainability, 2018, 10, 2840.
Melsom: "50-Years of Keeping the Rubber Industry in the Black" ASTM Standardization News, Dec. 2006.
Darmstadt et al.: "Inorganic Components and Sulphur Compounds in Carbon Blacks from Vacuum Pyrolysis of Used Tires", KGK Kautschuk Gummi Kunststoffe 47, Jan. 1994.
Roy et al.: "Carbon blacks recovered from rubber waste by vacuum pyrolysis—comparison with commercial grades" Plastics, Rubber and Composites Processing and Application, 27 (1998) 341.
Flanigan et al.: "Comparative Study of Silica, Carbon Black and Novel Fillers in Tread Compounds", Presented at the Fall 180th Technical Meeting of the Rubber Division of the American Chemical Society, Inc.,Cleveland, OH Oct. 11-13, 2011.
Gruber et al.: Raman Studies of Heat-treated Carbon Blacks, Carbon, vol. 32, No. 7,pp. 1377-1382, 1994.
U.S. Tire Manufacturers Association, What's in a Tire, https://www.ustires.org/whats-tire-0 accessed 2020.
Wang et al.: "Carbon Black", Kirk-Othmer Encyclopedia of Chemical Technology, Nov. 14, 2003.

(56) References Cited

OTHER PUBLICATIONS

Naskar et. al: "Tailored recovery of carbons from waste tires for enhanced performance as anodes in lithium-ion batteries", RSC Adv., 2014, 4, 38213.

* cited by examiner

FIGURE 10A
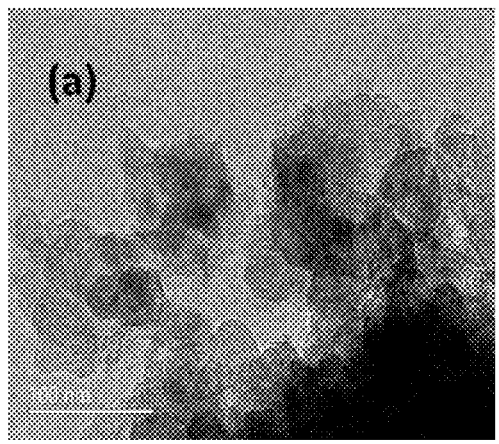
FIGURE 10B
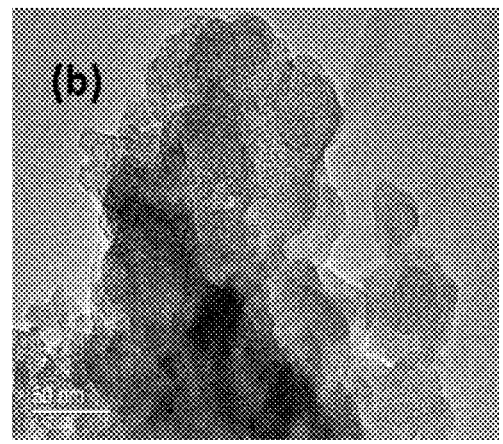
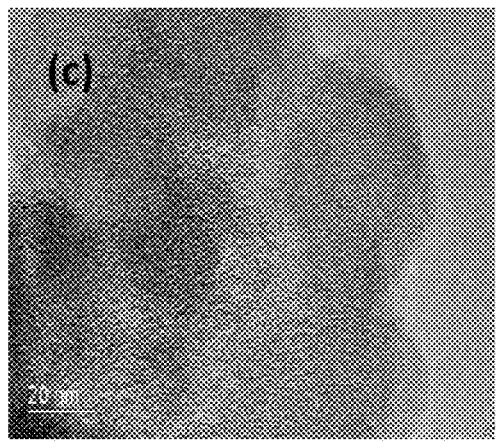
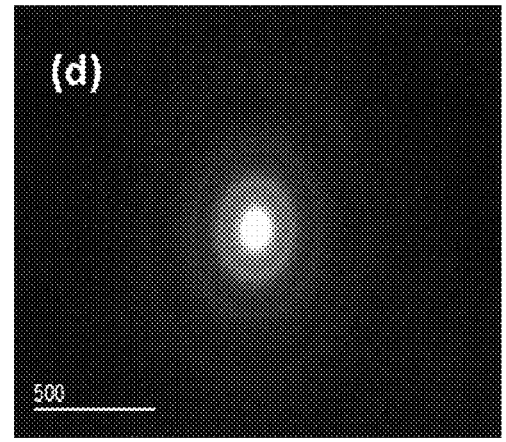
FIGURE 10C
FIGURE 10D

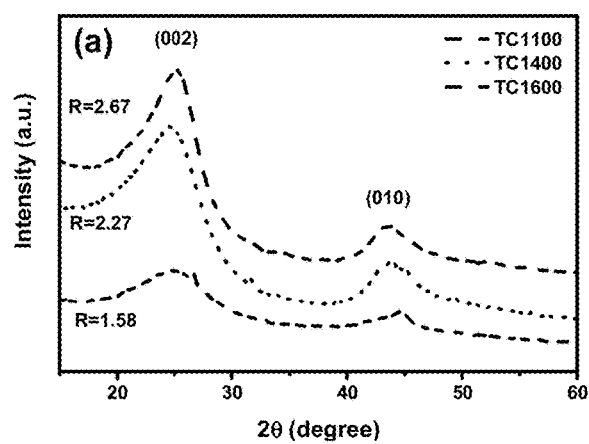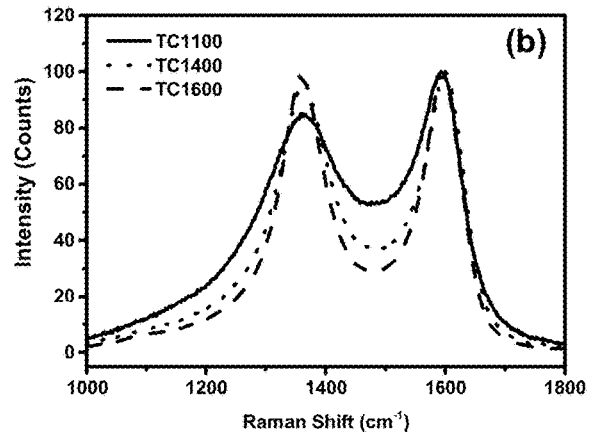
FIGURE 12A                    FIGURE 12B

FIGURE 14A FIGURE 14B
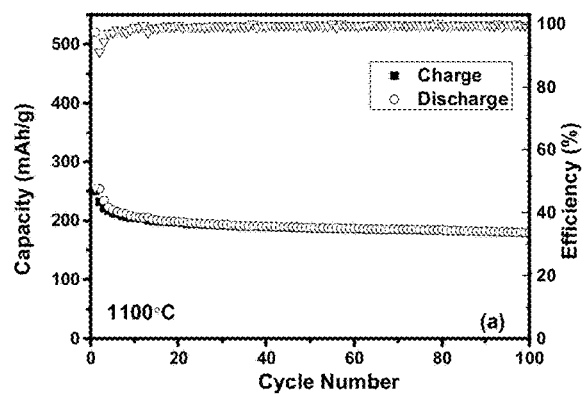 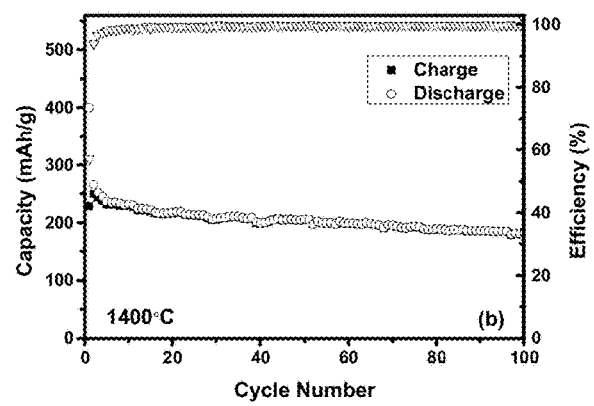
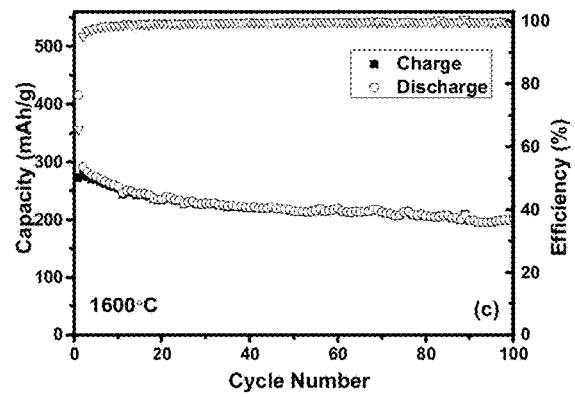 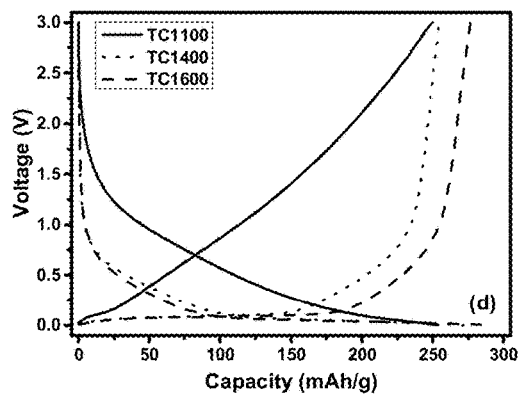
FIGURE 14C FIGURE 14D

PYROLYTIC CARBON BLACK COMPOSITE AND METHOD OF MAKING THE SAME

CROSS REFERENCE TO RELATED APPLICATIONS

This application is a divisional application of U.S. patent application Ser. No. 15/056,184, filed on Feb. 29, 2016, which is a continuation-in-part of U.S. patent application Ser. No. 13/945,239, filed on Jul. 18, 2013, now U.S. Pat. No. 9,441,113, issued on Sep. 16, 2016, the entireties of which are hereby incorporated by reference.

STATEMENT REGARDING FEDERALLY SPONSORED RESEARCH

This invention was made with government support under contract No. DE-AC05-00OR22725 awarded by the U.S. Department of Energy. The government has certain rights in this invention.

FIELD OF THE INVENTION

This invention relates generally to producing materials containing carbon particles, and more specifically to the production of materials containing carbon particles for battery electrodes.

BACKGROUND OF THE INVENTION

The widespread use of motor vehicles unavoidably results in large quantities of used tires. Globally, it is estimated that about 1.5 billion waste tires are produced every year. In the past, used tires were mostly disposed in landfills, which is not a sustainable solution. As more and more discoveries find that discarded tires pose serious environmental and health threats to our society, proper recycling of worn-out tires has become a critical issue. More recently other usages of ground rubber tires have been found. In 2003 nearly 290 million scrap tires were generated in the United States, and almost 80% of those waste tires were consumed in applications for fuel, as additives in civil engineering applications, and other uses. The recycled tires are mainly consumed as fuel, additives to plastics, rubbers, or civil engineering applications.

The tire rubber formulation contains significant quantities of carbon black that is used as reinforcing fillers and abrasive resistance for rubber matrices. Typically, a tire consists of natural rubber, synthetic polyisoprene, butadiene rubber, styrene-butadiene rubber, carbon black and a fractional amount of additives. High structure carbon black made of clusters of ~10-100 nm size fundamental particles are used in tire rubber formulations to enhance mechanical properties of the product. The regular direct pyrolysis process results in the production of about 30-40 wt. % carbon black, depending on the pyrolysis conditions. Rubber particles do not exist as a single fundamental particle; rather they are fused together during production of black to make aggregates of various structures. Such structures are retained in vulcanized rubber products such as pneumatic tires that contain dispersed phases of carbon black in rubber matrix.

The waste tire rubber is usually cryogenically pulverized into small micron-sized rubber particles. Cut rubber pieces are also ground in ambient conditions to get powder buffing. Those powdered tire rubbers are usually used as fillers in various low-cost rubber or plastic products. Isolation of the carbon black from tire formulations was tried but such products are not necessarily good reinforcing fillers for a new rubber formulation. Utilization of tire rubber materials for value-added applications would be very attractive not only for the recovery of materials but also to control global pollution.

The search for suitable electrode materials for sodium-ion batteries has become more urgent owing to the great need for large-scale energy storage. With the concerns of the limited global availability of lithium resources and high cost, sodium-ion batteries (SIBs) are considered to be an alternative to lithium-ion batteries (LIBs) for stationary grid energy storage of electricity produced from renewable sources. Due to its high abundance, low cost, and suitable working chemical potential (−2.7 V vs. Standard Hydrogen Electrode), rechargeable sodium-ion batteries are gradually attracting a lot of attention. Sodium shares many similar chemical properties with lithium because of its location in the periodic table and the similarities of fundamental principles of SIBs and LIBs. Thus far, several suitable cathode materials have been developed for SIBs. However, the absence of good anode material hinders the application of SIBs. Unlike the successful application of graphite as anodes in LIBs, the electrochemical sodium insertion into graphite is proven to be not favorable. Theoretical calculations suggest that the interlayer distance of graphite is too small to accommodate the large $Na^+$ ion, and a minimum interlayer distance of 0.37 nm is believed to be good for $Na^+$ insertion. In this regard, a variety of carbon materials have been investigated as anodes for SIBs, such as hard carbons, carbon nanotubes, reduced graphene oxides, and expanded graphite. Hard carbon is likely to be the most promising because of its stability, high capacity, and easy scale-up. However, great amounts of the currently studied hard carbon are produced from sucrose, banana peels and dopamine among others. Most of the precursors are relatively high cost or require complex treatments, which prevent the application in many cost sensitive fields. A low-cost hard carbon anode material is desired for promoting the development of SIBs for large-scale energy storage market.

SUMMARY OF THE INVENTION

A method of recovering carbon black comprises the steps of providing a carbonaceous source material containing carbon black, contacting the carbonaceous source material with a sulfonation bath to produce a sulfonated material, and pyrolyzing the sulfonated material to produce a carbon black containing product comprising a glassy carbon matrix phase having carbon black dispersed therein.

The sulfonation bath can be an oleum bath. The sulfonation bath can comprise a sulfonation agent such as chlorosulfonic acid in 1,2 dichloroethane solution. The sulfonation bath can comprise between 0.1-65 wt. % $SO_3$. The sulfonation bath can comprise 2-30 wt. % $SO_3$. The sulfonation bath can have a temperature of between −20° C. to 200° C.

The pyrolysis step can be conducted at a temperature that is greater than 200° C. The pyrolysis step can be conducted at a temperature that is greater than 400° C. The pyrolysis step can be conducted at a temperature that is greater than 1000° C. The pyrolysis step can be conducted at a temperature that is between 200-1000° C. The duration of the pyrolysis step can be from 1 minute to 48 hours.

The method can further comprising the step of reducing the carbonaceous source material to a powder prior to contacting the carbonaceous source material with the oleum bath. The powder or crumb rubber pieces can have an average maximum dimension of less than 100 nm to 10 cm.

The carbonaceous source material can comprise carbon reinforced composites. The carbon reinforcing agent can be at least one selected from the group consisting of carbon black, carbon particles, nanoparticles, mesoparticles and fibers. Mesoparticles are in the range of 100 nm to few microns in size with a pore diameter of 7-20 nm and high surface area. The carbonaceous source material can be a waste material, for example, particularly recyclable material. The waste material can be rubber tires, for example.

The average pore size of the carbon black product can be less than 8 nm. The average pore size of the carbon black product can be between 2 and 120 nm. The isolated carbon can be further surface activated and the density of average pore size of the carbon black product between 1 and 20 nm can be increased.

The carbon black containing product can have a specific surface area of less than 3000 $m^2/g$. The carbon black containing product can have a specific surface area of less than 2000 $m^2/g$, or less than 1000 $m^2/g$. The carbon black containing product can have a specific surface area of less than 100 $m^2/g$. The carbon black containing product can have a specific surface area of less than 10 $m^2/g$.

The pyrolyzing step can occur after the contacting step. The pyrolyzing step can occur before the contacting step.

A method of making a battery electrode comprising carbon black can include the steps of providing a carbonaceous source material containing carbon black, contacting the carbonaceous source material with an oleum bath to produce a sulfonated material, pyrolyzing the sulfonated material to produce a carbon black product comprising a glassy carbon matrix phase having carbon black dispersed therein, and forming a battery electrode from the carbon black containing product. The battery electrode can be an anode. The battery can be a lithium ion or a sodium ion battery. The battery electrode can be two active electrodes. The battery can be a supercapacitor.

A method of recovering carbon black includes the step of providing a carbonaceous source material containing carbon black. The carbonaceous source material is contacted with a sulfonation bath to produce a sulfonated material. The sulfonated material is pyrolyzed at a temperature of from 1100 to 1490° C. to produce a layered carbon black containing product comprising a glassy carbon matrix phase having carbon black dispersed therein. The layered carbon black containing product has an interlayer spacing of from 4 to 5 angstroms (0.4 to 0.5 nm).

A method of making a battery electrode comprising carbon black can include the step of providing a carbonaceous source material containing carbon black, contacting the carbonaceous source material with an oleum bath to produce a sulfonated material, and pyrolyzing the sulfonated material at a temperature of from 1100 to 1490° C. to produce a layered carbon black product comprising a glassy carbon matrix phase having carbon black dispersed therein. The layered carbon black containing product can have an interlayer spacing of from 4 to 5 angstroms (0.4 to 0.5 nm). A battery electrode can then be formed from the carbon black containing product.

A battery can include an anode comprising layered carbon black containing product obtained by providing a carbonaceous source material containing carbon black, contacting the carbonaceous source material with an oleum bath to produce a sulfonated material, pyrolyzing the sulfonated material at a temperature of from 1100 to 1490° C. to produce the layered carbon black product comprising a glassy carbon matrix phase having carbon black dispersed therein. The layered carbon black containing product having an interlayer spacing of from 4 to 5 angstroms (0.4-0.5 nm). A cathode is provided and an electrolyte is disposed between the anode and the cathode.

BRIEF DESCRIPTION OF THE DRAWINGS

There are shown in the drawings embodiments that are presently preferred it being understood that the invention is not limited to the arrangements and instrumentalities shown, wherein:

FIGS. 10A, 10B and 10C are TEM images of control tire rubber (Sample #1)—derived carbon. FIG. 10D is a Selected Area Electron Diffraction pattern.

FIG. 12A is X-ray diffraction patterns and FIG. 12B Raman spectra of tire-derived carbons obtained by pyrolyzing at different temperatures.

FIGS. 14A, 14B, 14C and 14D demonstrate cycling performances of (14A) TC1100, (14B) TC1400, and (14C) TC1600, and (14D) a comparison of discharge and charge curves of all the carbons.

DETAILED DESCRIPTION OF THE INVENTION

Figure 1:
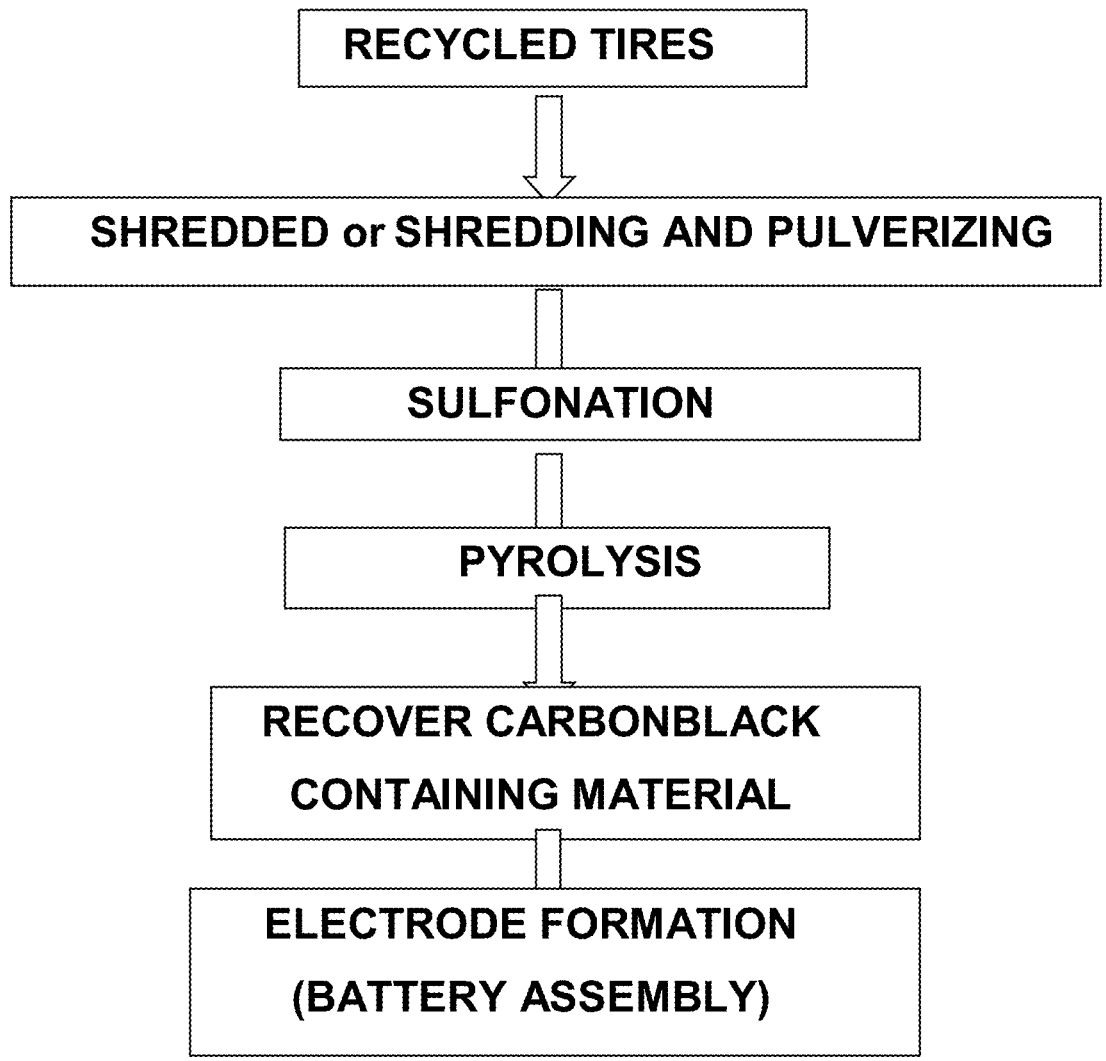
FIG. 1 is a schematic diagram of a method for recovering carbon black in modified form from recycled tire rubber.

A method of recovering carbon black as shown in FIG. 1 includes the step of providing a carbonaceous source material containing carbon black. The carbonaceous source material is soaked in a sulfonation bath to produce a sulfonated material. The sulfonated material is pyrolyzed to produce a carbon black containing product comprising a glassy carbon matrix phase having carbon black dispersed therein.

The sulfonation bath can comprise any reactant composition capable of sulfonating rubber. It is also capable of sulfonating vulcanized particulate rubbers containing carbon black or carbon particles or carbon fiber or carbon nanomaterials. In one aspect the sulfonation bath can be an oleum bath. The oleum bath can comprise up to 65 wt. % $SO_3$ in concentrated sulfuric acid. Very high $SO_3$ content in oleum bath causes solidification of reactant mix and therefore, may not be useful for processing. The sulfonation bath can be a sulfuric acid ($H_2SO_4$) solution. The concentration of sulfuric acid in the oleum bath can be between 10 and 100 wt. %. The sulfonation bath can comprise other sulfonation agents such as chlorosulfonic acid in 1,2 dichloroethane solution, organic solvents (such as 1,2 dicholoroethane) containing $SO_3$ gas, or equimolar mixture of acetic anhydride concentrated sulfuric acid that yields acetyl sulfate. Acetyl sulfate assists in electrophilic sulfonation of aromatic ring in styrene containing rubbers but $SO_3$ can aid free radical sulfonation of aliphatic segments. Thus, the sulfonation bath can comprise a liquid, a gas, or a liquid and a gas. The sulfonation bath can comprise between 0.1-65 wt. % $SO_3$ in liquid medium that can be concentrated sulfuric acid or organic solvents. The sulfonation bath can comprise any minimum percentage and maximum percentage within this range, such as 5-20, 2-18, 2-30, or 0.1-2 wt. % $SO_3$.

The sulfonation bath can have a temperature of between −20 to 200° C.

The pyrolysis step can be conducted at a temperature that is greater than 400° C. The pyrolysis step can be conducted at a temperature that is greater than 1000° C. The pyrolysis step can be conducted at a temperature that is between 200-1000° C. The duration of the pyrolysis step can be from 1 minute to 12 hours or more. The conditions of the pyrolysis step such as temperature and duration can be selected depending on process conditions including the particular carbonaceous source material that is being pyrolyzed.

The pyrolysis step of high carbon content hydrocarbon polymer composites can also be maintained at the desulfonation temperature range when sulfur containing volatiles comes out of the material leaving unsaturated hydrocarbon with high carbon content.

The carbon content in pyrolyzed carbon materials can be higher than 80 wt. %.

The method can include the steps of reducing the carbonaceous source material to a powder prior to contacting the carbonaceous source material with the oleum bath. The powder can be formed by any suitable method such as grinding, milling, cutting, and cryogenic pulverization. The powder so formed can have an average maximum dimension of less than 100 nm to 10 cm. Also, crumb rubber with a size of less than 10 cm wide can also be used without grinding. Metal particles such as Ni, stainless steel, Iron, and oxides such as ZnO, SiO2 and others present along with carbonaceous source material may also dissolve in the oleum bath and yield carbon powder with no metals and/or oxides or up to ppm levels of metals. The presence of Ca comes from caolin or talc filler in rubber compounds and can form insoluble sulfates by reaction with sulfonating agents such as, for example, sulfuric acid. To avoid such impurities, if required, the tire rubbers can be washed with aqueous hydrochloric acid, nitric acid, or an acidic salt (for example ammonium chloride) solution prior to sulfonation.

The carbonaceous source material can be any suitable carbon black containing source material. One such source material comprises carbon black loaded plastics, scrap electronic casing containing carbon black loaded plastics that serve as electromagnetic shielding material, polymeric carbon nanocomposites containing carbon particles, and carbon fiber reinforced composites. The carbonaceous source material can be a waste material, such as scrap vulcanized rubber tires or recycled vulcanized rubbers from other sources.

The product of the invention is a carbon black containing product comprising a glassy carbon matrix phase having carbon black dispersed therein. The carbon black containing carbonaceous product is porous with a multi-modal pore size distribution with some pore width r, where 8 nm<r>120 nm and some pore width less than 8 nm but greater than 2 nm. The average pore size of the carbon black containing product can be between 2 and 120 nm. The carbon black containing product can have a Brunauer-Emmett-Teller (BET) specific surface area of less than 1000 $m^2/g$ depending on the continuity of carbon matrix. The specific surface area in composite can be less than 100 $m^2/g$.

The BET specific surface area in the carbon particle containing carbon matrix products can further be modified by deploying a surface activation process. Surface activation process is well known in art that produces activated carbon. Activated carbon can be synthesized from pyrolyzed carbon residues by activating it in steam or $CO_2$ at elevated temperature ranging from 200 to 1000° C. that results partially burnt out carbon residue with higher porosity. The added porosity by surface activation is usually microporosity with pore widths less than 50 nm. Activation of carbon can also be achieved by treating it with alkali followed by heat treatment in the presence of water vapors.

A battery electrode can be formed from the carbon black containing product. This electrode can be an anode for lithium-ion or sodium-ion batteries.

A method of making a battery electrode comprising carbon black can include the steps of providing a carbonaceous source material containing carbon black, contacting the carbonaceous source material with a sulfonation bath to produce a sulfonated material, pyrolyzing the sulfonated material to produce a carbon black containing product comprising a glassy carbon matrix phase having carbon black dispersed therein; and forming a battery electrode from the carbon black containing product. The electrode can be an anode. The battery can be formed by suitable techniques. The battery can be a lithium (Li) ion battery, and/or a sodium (Na) ion battery.

Carbon black was recovered from powdered tire rubber by two methods: (1) simple pyrolysis of powder rubber at 1000° C. (nitrogen atmosphere) that yields 30-40% carbon (control rubber tire-derived carbon, Sample #1) and (2) digestion of rubber powders in a hot oleum bath (18-24% $SO_3$) to yield sulfonated rubber powder that was then filtered, washed and compressed to make a solid cake followed by pyrolysis in an inert atmosphere (sulfonated rubber tire-derived carbon, Sample #2). Sample 2 produced a carbon monolith with a little higher yield (2-5% increase in carbon yield compared to the control rubber powder; Sample 1) whereas Sample 1 produced fluffy (low bulk density) powder of carbon black. The isolated carbon material (from either sample) was used to test their electrochemical performance as an active anode material in Li-ion battery.

Carbon black was also isolated from ground tire rubber by conventional pyrolysis (400-1000° C. in inert atmosphere) followed by treatment of the char with oleum bath and subsequent heat treatment of washed/dried charred residue in inert environment. The oleum bath can have a concentration of 0.1-30 wt. % $SO_3$. Since the material was charred before treatment in sulfonation bath it does not require very high temperature treatment in second carbonization step. The second heat treatment can be above 200° C.; however, higher temperature gives higher rigidity or graphitic order in the derived carbon.

Example 1

Tire rubber powder of 80-120 μm size range consisting of polymer mixture of natural rubber, butadiene rubber, and styrene-butadiene rubber (45%), carbon black (33%), inorganic filler and vulcanization activator (10%) and residual extractable and volatile materials with specific gravity of 1.15 g/cc was used for the pyrolytic recovery of carbon black. The powder rubber sample was heated in a tubular furnace under nitrogen atmosphere at 1000° C. The temperature of the furnace was raised from room temperature to 1000° C. by heating it at 10° C./min and when it reached at 1000° C. it was held at that temperature for 15 minutes. The furnace was cooled to room temperature and the carbon residue was collected. The sample is termed as control carbon (Sample #1). The carbon black yield was 33%.

Example 2

Tire rubber powder of 80-120 μm size range consisting of polymer mixture of natural rubber, butadiene rubber, and styrene-butadiene rubber (45%), carbon black (33%), inorganic filler and vulcanization activator (10%) and residual extractable and volatile materials with specific gravity of 1.15 g/cc was used for a chemical pretreatment prior to pyrolysis. The tire rubber powder was treated with fuming sulfuric acid containing 20 wt. % free $SO_3$ gas at 70° C. for 12 h. The tire rubber slurry was filtered on a Buchner funnel with sintered glass disc (fritted glass funnel) using an aspirator followed by washing with distilled water. The washed sulfonated tire rubber cake was then dried at 80° C. for 1 h followed by pyrolysis in tubular furnace under nitrogen atmosphere at 1000° C. The furnace temperature was reached to 1000° C. by heating the furnace from room temperature at 10° C./min and allowing a soak time of 15 minute at 1000° C. The furnace was allowed to cool to room temperature and the environment was maintained under nitrogen before the sample was taken out.

Example 3

Tire rubber powder of 80-120 μm size range consisting of polymer mixture of natural rubber, butadiene rubber, and styrene-butadiene rubber (45%), carbon black (33%), inorganic filler and vulcanization activator (10%) and residual extractable and volatile materials with specific gravity of 1.15 g/cc was used for a chemical pretreatment prior to pyrolysis. The tire rubber powder was treated with fuming sulfuric acid containing 20 wt. % free $SO_3$ gas at 70° C. for 12 h. The tire rubber slurry was filtered on a Buchner funnel with sintered glass disc (fritted glass funnel) using an aspirator followed by washing with distilled water. The washed sulfonated tire rubber cake was then pressed between Teflon sheets under a hot plate inside a compression mold at 110° C. to get rid of moisture and to obtain a thick (2 mm) molded sheet followed by pyrolysis in tubular furnace under nitrogen atmosphere at 1000° C. The furnace temperature reached 1000° C. by heating the furnace from room temperature at 10° C./min and allowing a soak time of 15 minutes at 1000° C. The furnace was allowed to cool to room temperature and the environment was maintained under nitrogen before the monolith carbon sample was taken out. The sample is termed as sulfonated tire-rubber-derived carbon (Sample #2). The yield of carbon based on as received material (non-sulfonated rubber) was 38%.

Example 4

The tire rubber of 0.5 mm size consisting of polymer mixture of natural rubber, butadiene rubber, and styrene-butadiene rubber (42%), carbon black (33%), inorganic filler and vulcanization activator (11%) and residual extractable and volatile materials with specific gravity of 1.14 g/cc was used for a chemical pretreatment prior to pyrolysis. The tire rubber was treated with fuming sulfuric acid containing 30 wt. % free $SO_3$ gas at 40° C. for 48 h. The tire rubber slurry was filtered on a fritted glass funnel using an aspirator followed by washing with distilled water. The washed sulfonated tire rubber cake was then dried at 80° C. for 1 h followed by pyrolysis in tubular furnace under nitrogen atmosphere at 600° C. The furnace temperature reached 600° C. by heating the furnace from room temperature at 10° C./min and allowing a soak time of 60 minutes at 600° C. The furnace was allowed to cool to room temperature and the environment was maintained under nitrogen before the sample was taken out. The yield of carbon based on as received material (non-sulfonated rubber) was 40%.

Example 5

Tire rubber powder of 80-120 μm size range consisting of polymer mixture of natural rubber, butadiene rubber, and styrene-butadiene rubber (45%), carbon black (33%), inorganic filler and vulcanization activator (10%) and residual extractable and volatile materials with specific gravity of 1.15 g/cc was used for a chemical pretreatment prior to pyrolysis. The tire rubber powder was treated with concentrated sulfuric acid (98% $H_2SO_4$) at 100° C. for 24 h. The tire rubber slurry was filtered on a fritted glass funnel using an aspirator followed by washing with distilled water. Washed sulfonated tire rubber cake was then dried at 80° C. for 1 h followed by pyrolysis in tubular furnace under nitrogen atmosphere at 600° C. The furnace temperature reached 600° C. by heating the furnace from room temperature at 10° C./min and allowing a soak time of 60 minute at 600° C. The furnace was allowed to cool to room temperature and the environment was maintained under nitrogen before the sample was taken out. The yield of carbon based on as received material (non-sulfonated rubber) was 37%.

Example 6

Carbon black was isolated from ground tire rubber by conventional pyrolysis at 600° C. in inert atmosphere. The isolated porous carbon or the char was treated in oleum bath at 70° C. for 12 h; the oleum had 20 wt. % $SO_3$ in concentrated sulfuric acid. The slurry of carbonaceous mass was washed, dried, and subsequent heat treated in inert environment (N2) at 1000° C. The heating of furnace was conducted at 12° C./min from room temperature to 1000° C. and maintained 1000° C. for 15 minutes before it was cooled to room temperature.

In all the examples, pyrolysis can also be done in Argon or other inert atmosphere such as Helium instead of nitrogen atmosphere.

Results

The schematic of the recovery of pyrolytic carbon black materials (both in unmodified and modified forms), from the recycled tires, is shown in FIG. 1. The schematic shows that these are used as low-cost anodes in lithium-ion batteries.

Figure 2:
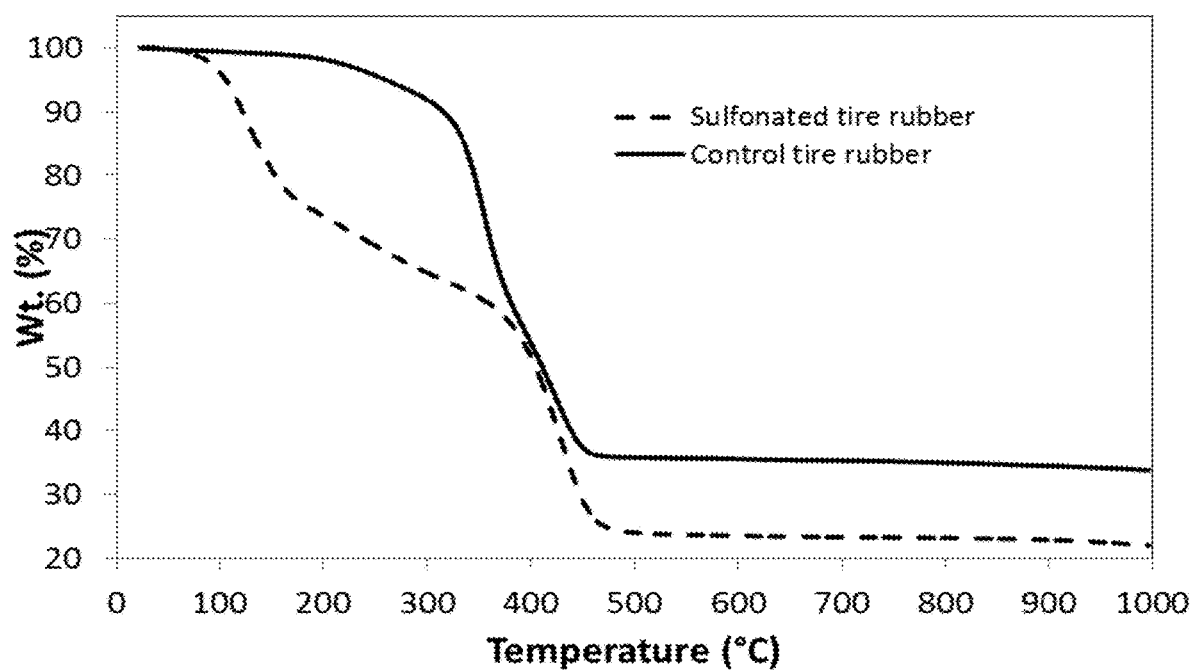
FIG. 2 is thermogravimetric analysis (TGA) thermograms of precursors for Sample #1 (control tire rubber) and Sample #2 (sulfonated tire rubber).

The TGA data of the Samples 1-2 are shown in FIG. 2. The first weight loss in sample 2 around 150° C. is the desulfonation step that shifts the pyrolysis temperature of rubber to slightly higher temperature. The relative char yield in desulfonated material, compared to control tire rubber (Sample #1), is slightly higher.

Figure 3A:
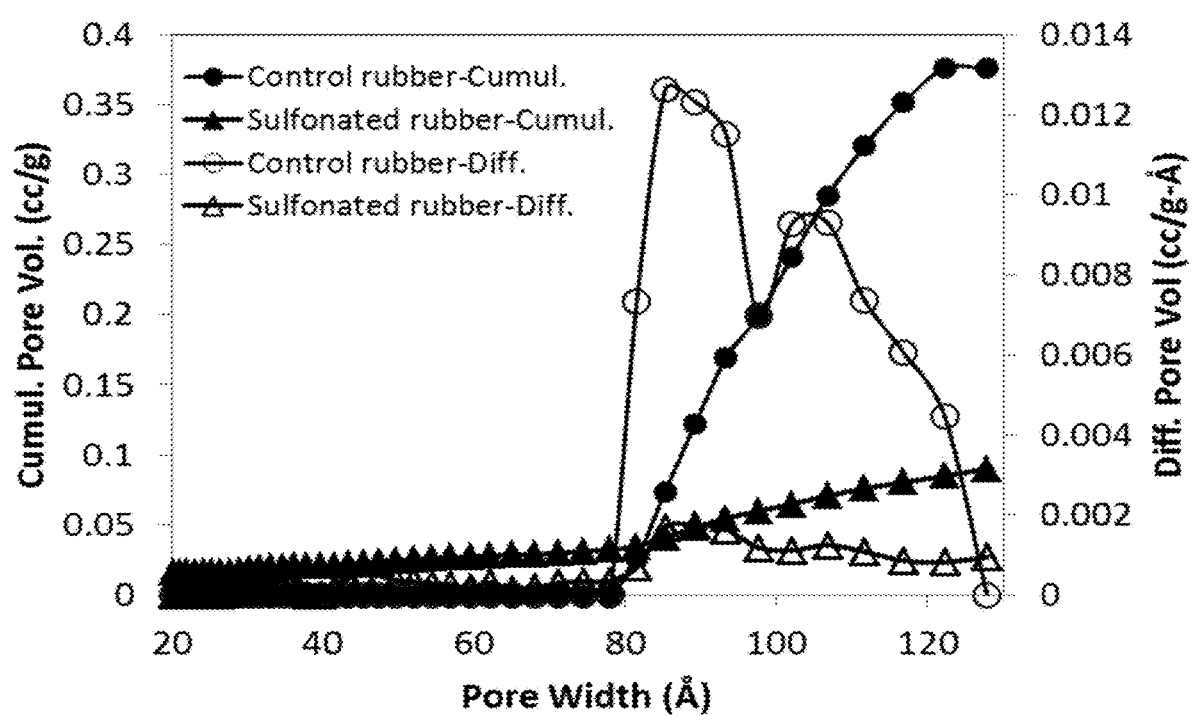
FIG. 3A is cumulative pore volume data based on BET adsorption-desorption data analysis of carbons from Sample #1 (control tire rubber-derived carbon) and Sample #2 (carbon from sulfonated tire rubber powder).
Figure 3B:
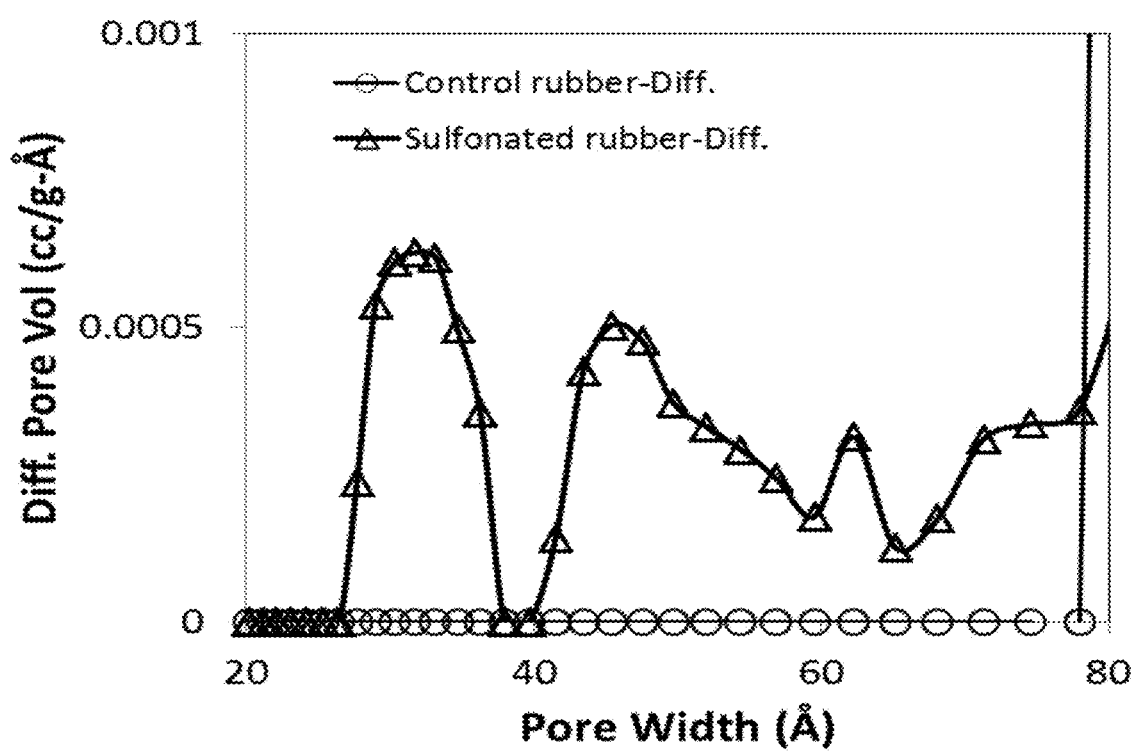
FIG. 3B is differential pore volume in both carbons (in magnified scale) at smaller pore widths.

The Brunauer-Emmett-Teller (BET) surface area analysis of the recovered carbon from Samples 1 and 2 are displayed in FIG. 3. In control Sample #1 the pore sizes are in the range of 8-13 nm (80-130 Å) and it does not show any pore width smaller than 8 nm. However the sulfonation treatment prior to pyrolysis allows formation very small volume fraction of pores with width of 3-4 nm. Without wishing to be limited, it is believed that these pores are detected due to the thin carbon films created on the carbon black particles by the pyrolyzing char-forming rubber (sulfonated rubber). When the rubber is not sulfonated it does not yield detectable char. Further, sulfonation creates hard carbon with low pore volume. Data analysis shows that sulfonated tire rubber yields carbon with 64 $m^2/g$ specific surface area; whereas that of the control carbon (fluffy carbon from Sample #1) is 96 $m^2/g$.

Electrochemical studies were done by preparing CR2032 coin cells. The coin half cells were assembled in an argon-filled glove box using recycled carbon (Samples #1 and #2), as the working electrode and metallic lithium foil as the counter electrode. The anode was prepared by casting slurry of 80% active recycled carbon material, 5 wt. % super conducting carbon, and 15 wt. % polyvinylidene difluoride (PVDF) binder in n-methyl-2-pyrrolidone (NMP) solvent on copper foil. The main characteristics of conducting carbon are high purity, long structure and moderate surface area. It is also possible use up to 95% active recycled carbon material and down to 5 wt. % polyvinylidene difluoride (PVDF) binder in n-methyl-2-pyrrolidone (NMP) solvent on copper foil. The electrolyte for Li-ion batteries consisted of a solution of 1 M $LiPF_6$ in ethylene carbonate (EC)/dimethyl carbonate (DMC)/diethyl carbonate (DEC) (1:1:1 by volume). Galvanostatic charge/discharge cycling between the voltages of 0-3.0 V was performed at room temperature under different rates using an Arbin potentiostat/galvanostat multichannel system. The use of active super carbon in the electrode slurry composition can be minimized and finally eliminated if the isolated carbons (Sample #1 or 2) are activated by conventional method for activated carbon synthesis, followed by high temperature treatment at temperature T, where 3000° C.<T>1000° C., that increases electrical conductivity significantly. Steam or $CO_2$ activation increases porosity and active surface area in the produced or recovered carbon materials.

Figure 4:
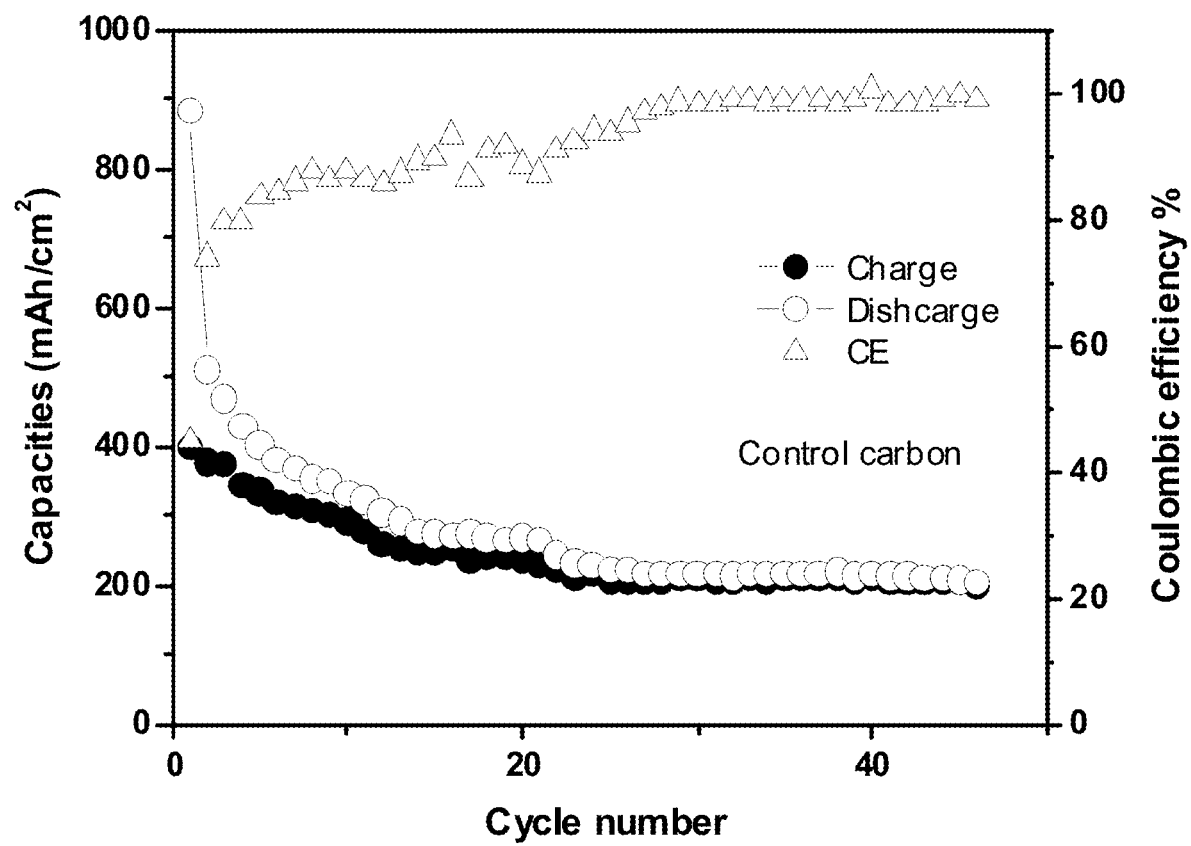
FIG. 4 is cycling performance of the control tire rubber-derived carbon (Sample #1) anode at 0.1 C.
Figure 5:
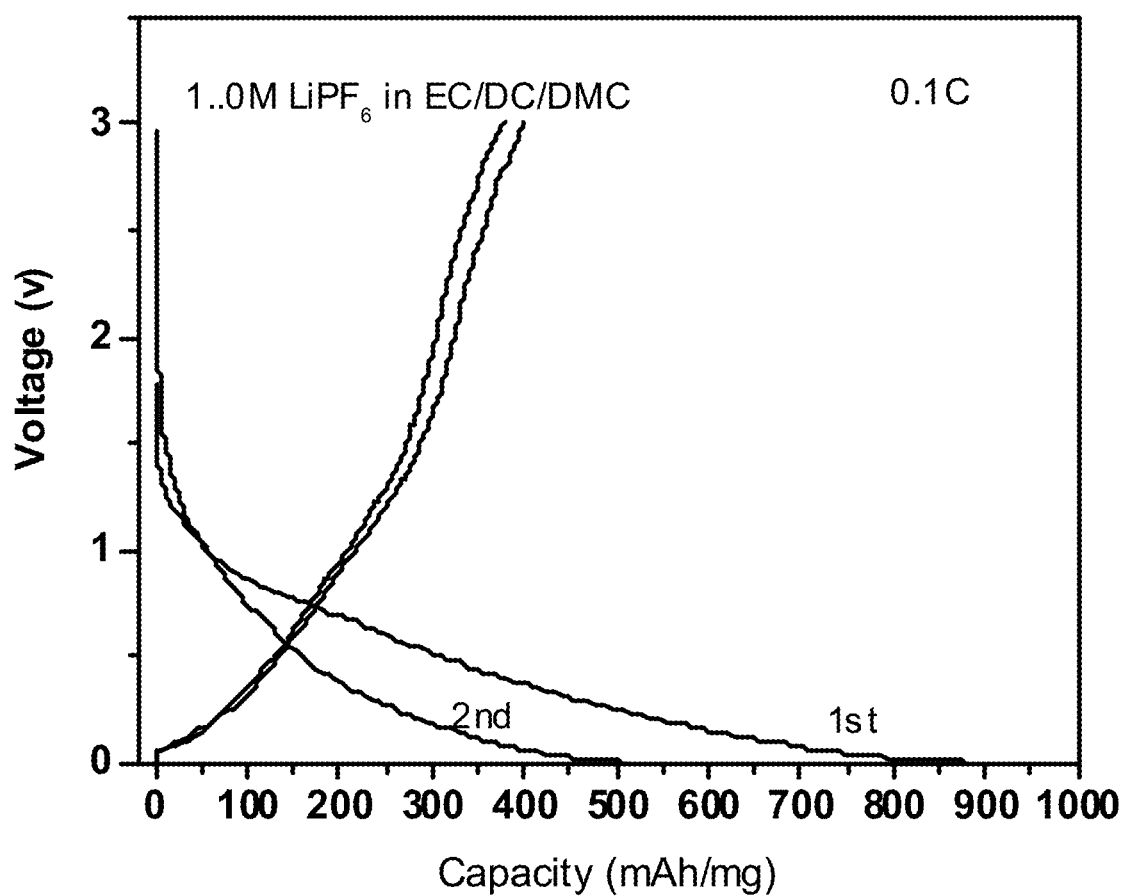
FIG. 5 is the 1st and 2nd charge-discharge curves of the control tire rubber (Sample #1)-derived carbon anode at 0.1 C.
Figure 6:
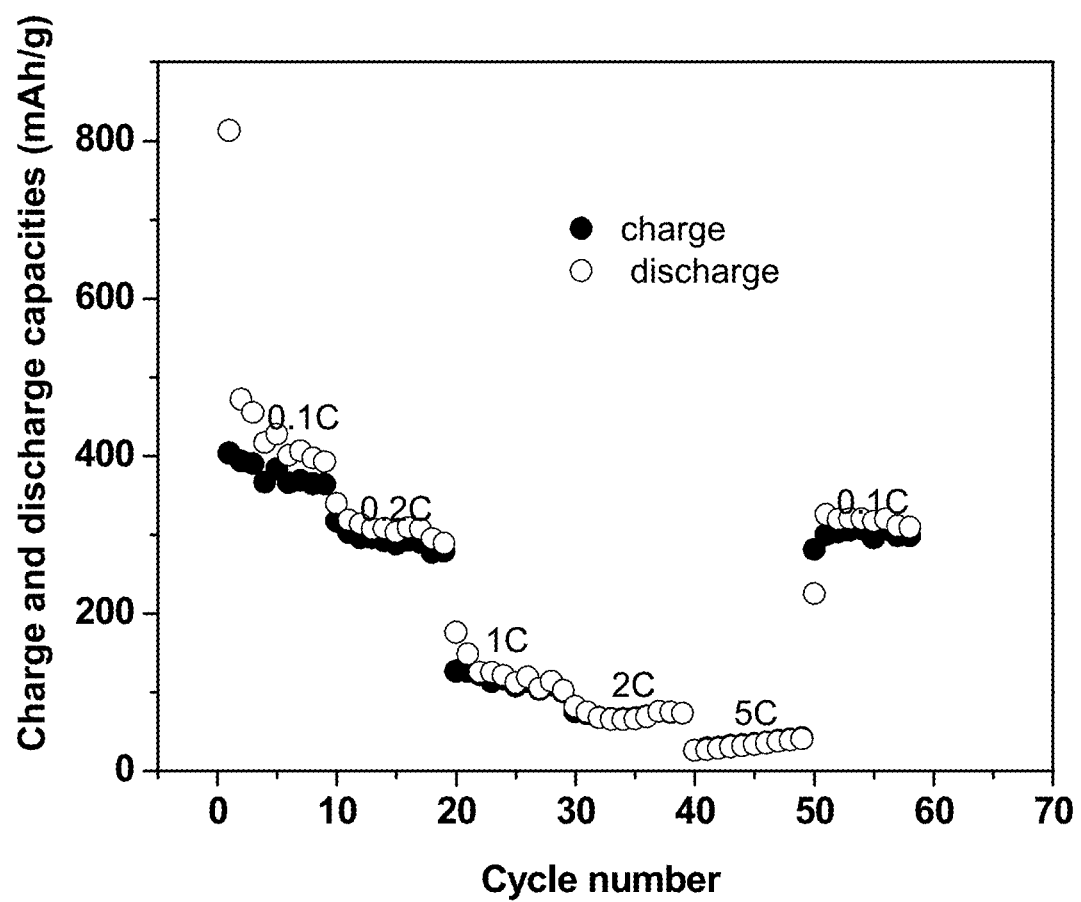
FIG. 6 is rate performance of the control tire rubber (Sample #1)-derived carbon anode.

FIG. 4 shows the cycling performance of the control tire rubber (Sample #1)-derived carbon at 0.1 C or C/10 (where 1 C corresponds to one charge-discharge cycle in an hour). FIG. 5 shows the galvanostatic discharge/charge curves of the same anodes (control tire rubber-derived carbon) between 0 and 3 V at a rate of 0.1 C. According to FIGS. 4 and 5, Sample #1-derived carbon exhibited an initial capacity of ~900 mAh/g at the first discharge, but the reversible capacity of only ~500 mAh/g was attained, which led to much lower initial coulombic efficiency of 45%. Then the capacity decreased to ~200 mAh/g and the coulombic efficiency increased slowly to 99% after 45 cycles. FIG. 6 shows the rate performance of the control tire rubber (Sample #1)-derived carbon anodes. It clearly shows a rate performance with ~100 mAh/g at 1 C, only ~40 mAh/g at 5 C, which are much lower than the sulfonated tire rubber (Sample #2)-derived carbon.

Figure 7:
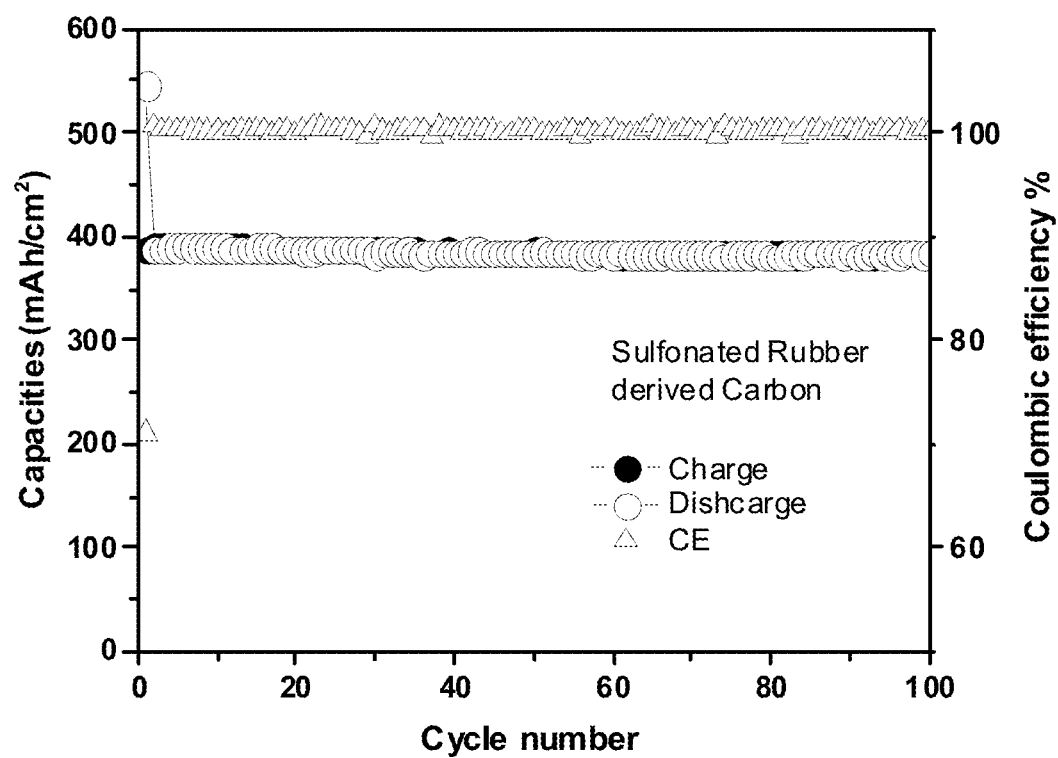
FIG. 7 is cycling performance of the sulfonated tire rubber (Sample #2)-derived carbon anode at 0.1 C.
Figure 8:
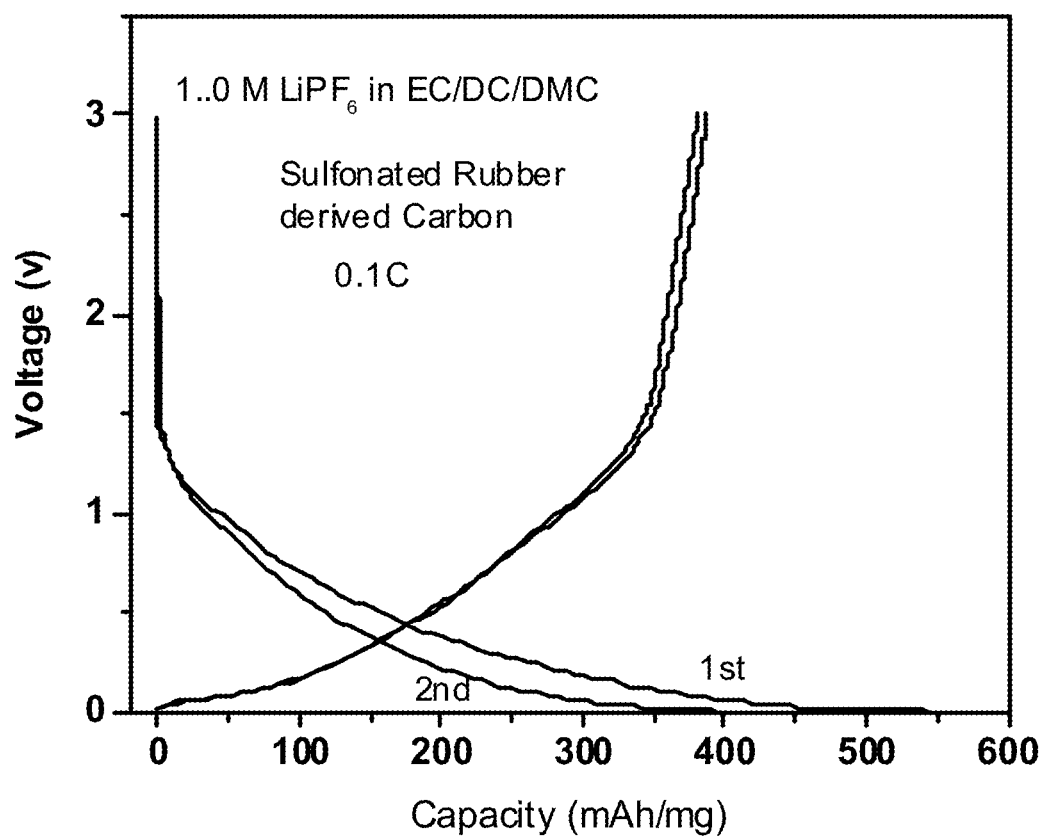
FIG. 8 is 1st and 2nd charge-discharge curves of the sulfonated tire rubber (Sample #2)-derived carbon anode at 0.1 C.
Figure 9:
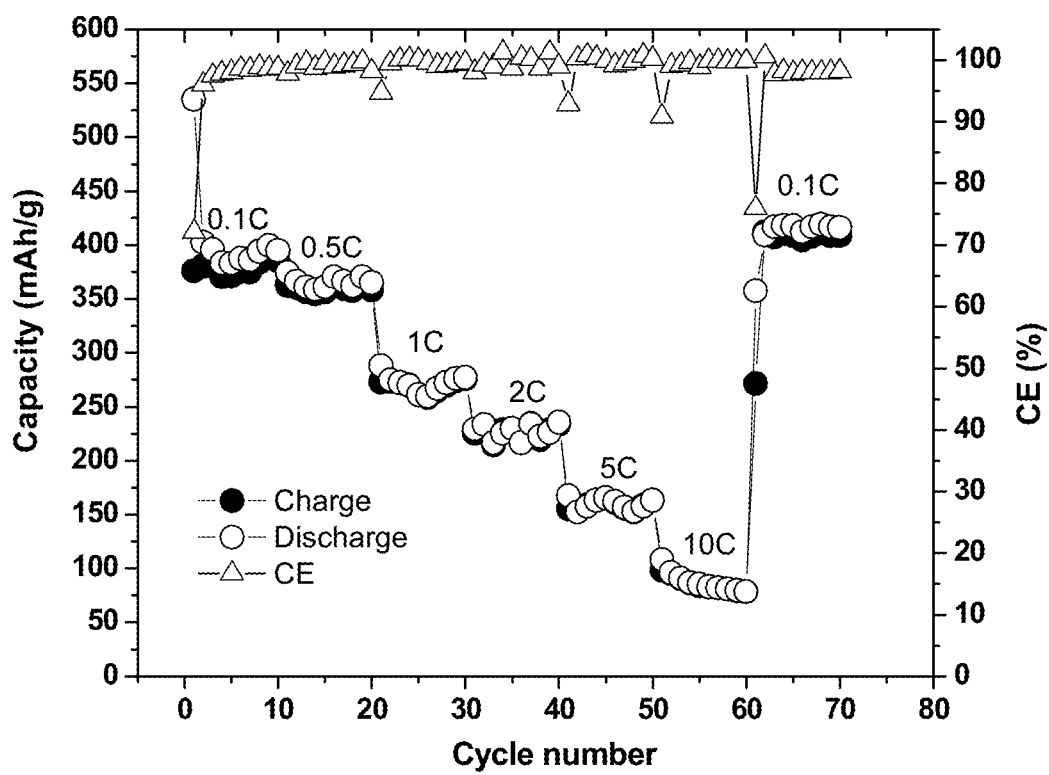
FIG. 9 is the rate performance of the half-cell made from sulfonated tire rubber (Sample #2)-derived carbon.

FIG. 7 shows the cycling performance of the half-cell made from sulfonated tire rubber-derived carbon (Sample #2) materials. A half-cell made by use of Sample #2 exhibited a reversible capacity of ~400 mAh/g after 100 cycles with coulombic efficiency of almost 100%. This result is comparable to the theoretical capacity of 362 mAh/g for commercial carbon anodes. FIG. 8 shows the galvanostatic discharge/charge curves of the anodes made from sulfonated tire rubber-derived carbon between 0 and 3 V at a rate of 0.1 C. During the first discharge, the voltage pseudoplateau near 0 V contributes to a large irreversible capacity. The first discharge capacity is around 500 mAh/g, and a reversible charge capacity around 400 mAh/g, leading to an irreversible capacity of 100 mAh/g. However, both second discharge capacity and reversible charge capacity is around 400 mAh/g. The reversible capacity was maintained to 100 cycles. FIG. 9 shows the rate performance of the sulfonated tire rubber-derived carbon (Sample #2) anodes. It clearly shows a good rate performance with ~270 mAh/g at 1 C, 160 mAh/g at 5 C, and over 50 mAh/g at 10 C. Results obtained from Sample #1 were compared with Sample #2. Based on these results, electrochemical performances of carbon from Sample #2 are much better than those from Sample #1.

Figure 11A:
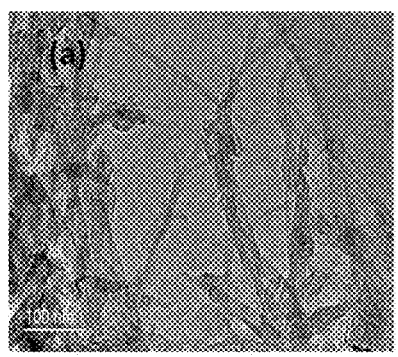
FIGS. 11A and 11B are TEM images of sulfonated rubber tire (Sample #2)—derived carbon.
Figure 11B:
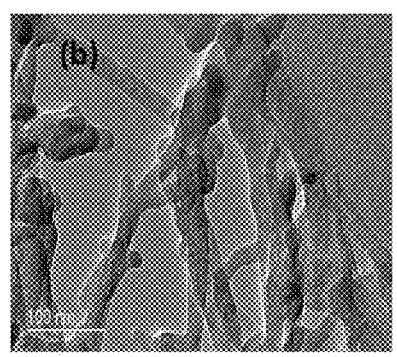
Figure 11C:
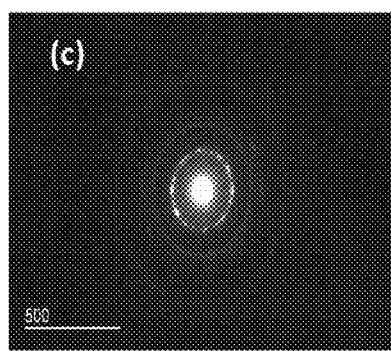
FIG. 11C is a Selected Area Electron Diffraction pattern.

TEM images of carbon from Samples #1 and #2 are reported in FIGS. 10 and 11. Sample #1 (FIG. 10) has the morphology of spherical nanoparticles with an irregular cluster shape. Selected Area Electron Diffraction pattern indicates the presence of completely amorphous carbon materials. Sample #2-derived carbon (FIG. 11) has the morphology of 1D (one dimensional) nanostructure. It formed a monolith hard carbon and when that was ground it formed fibriler or oriented structure. Selected Area Electron Diffraction pattern indicates the presence of both crystalline and amorphous carbon materials.

These results demonstrate that recycled carbon materials with proper treatment have been used successfully to develop a novel, low-cost, rechargeable anodes for lithium ion batteries. Recovered hard carbons when treated properly ($CO_2$ or steam activation) after or during carbonization can yield very high surface area. It is expected that sample #1 being amorphous in nature can be activated easily with higher burn out rate than that of sample #2 under identical conditions. An exemplary activation condition was exposure of the carbon samples at 700° C. under constant flow of $CO_2$ for 2 hours. Those activated carbons would be useful for supercapacitors, in addition to Li-ion batteries, Na-ion batteries, and other energy storage devices as well. The activation can also be done by treating sulfonated precursor to a high temperature where desulfonating gases cause surface activation. Sulfuric acid treated graphites particles are conventionally used to make exfoliated graphene oxide material [Hummers W S; Offeman R E. J. Am. Chem. Soc. 1985, 80(6), 1339].

Relatively low packing density and higher operating voltage are among the main obstacles for hard carbons to be used as an anode in LIBs. These obstacles are not as significant for SIB applications since sodium-ion batteries are mostly targeted for stationary energy storage and also the $Na/Na^+$ couple operates 0.34 V higher than $Li/Li^+$ couple. A higher temperature of pyrolysis leads to a larger sodium storage capacity, which behaves opposite to that of some hard carbons produced in the same temperature range and used against lithium. Unlike most hard carbon voltage profiles in LIBs, the plateau capacity at low-potential region increases significantly as the pyrolysis temperature increases, which is beneficial to increase the cell voltage and energy density.

A method of recovering carbon black includes the step of providing a carbonaceous source material containing carbon black. The carbonaceous source material is contacted with a sulfonation bath to produce a sulfonated material. The sulfonated material is pyrolyzed at a temperature of from 1100 to 1490° C. to produce a layered carbon black containing product comprising a glassy carbon matrix phase having carbon black dispersed therein. The layered carbon black containing product has an interlayer spacing of from 4 to 5 angstroms (0.4-0.5 nm).

The sulfonation bath can be an oleum bath. The sulfonation bath can include a sulfonation agent which can be chlorosulfonic acid in 1,2 dichloroethane solution. The sulfonation bath can include between 0.1-65 wt. % $SO_3$. The sulfonation bath can include 2-30 wt. % $SO_3$. The sulfonation bath can have a temperature of between −20° C. to 200° C.

The pyrolysis step can be conducted at any suitable temperature or range of temperatures from 1100° C. to 1490° C. The pyrolysis step can be conducted at a temperature that is greater than 1200° C. The pyrolysis step can be conducted at a temperature that is greater than 1300° C. The pyrolysis step can be conducted at a temperature from 1200-1400° C. The pyrolysis step can be conducted at a temperature from 1250-1350° C. The pyrolysis step is conducted at a temperature from 1100-1400° C. The pyrolysis step can be from 1 minute to 12 hours.

The method can further include the steps of reducing the carbonaceous source material to a powder or shredded tire pieces prior to contacting the carbonaceous source material with the oleum bath. The powder and/or crumb rubber pieces can have an average maximum dimension of less than 100 nm to 10 cm.

The carbonaceous source material can include carbon reinforced composites. The carbon reinforcing agent can be least one selected from the group consisting of carbon black, carbon particles, nanoparticles, mesoparticles and fibers. The carbonaceous source material can be a waste material. The waste material can be rubber tires.

The average pore size of the carbon black product can be less than 8 nm. The average pore size of the carbon black product can be between 2 and 120 nm. The isolated carbon can be further surface activated and the density of average pore size of the carbon black product between 1 and 20 nm is increased.

The carbon black containing product can have a specific surface area of less than 2000 $m^2$/g. The carbon black containing product can have a specific surface area of less than 1000 $m^2$/g. The carbon black containing product can have a specific surface area of less than 100 $m^2$/g.

The pyrolyzing step can occur after the contacting step. The pyrolyzing step can occur before the contacting step.

A method of making a battery electrode comprising carbon black can include the step of providing a carbonaceous source material containing carbon black, contacting the carbonaceous source material with an oleum bath to produce a sulfonated material, and pyrolyzing the sulfonated material at a temperature of from 1100 to 1490° C. to produce a layered carbon black product comprising a glassy carbon matrix phase having carbon black dispersed therein. The layered carbon black containing product can have an interlayer spacing of from 4 to 5 angstroms (0.4-0.5 nm). A battery electrode can then be formed from the carbon black containing product.

The battery electrode can be an anode. The battery can be a lithium ion battery or a sodium ion battery. The battery can have any suitable construction.

A battery can include an anode comprising layered carbon black containing product obtained by providing a carbonaceous source material containing carbon black, contacting the carbonaceous source material with an oleum bath to produce a sulfonated material, pyrolyzing the sulfonated material at a temperature of from 1100 to 1490° C. to produce the layered carbon black product comprising a glassy carbon matrix phase having carbon black dispersed therein. The layered carbon black containing product having an interlayer spacing of from 4 to 5 angstroms (0.4-0.5 nm). A cathode is provided and an electrolyte is disposed between the anode and the cathode. The layered carbon black containing product can have a surface atomic composition that is greater than 92% carbon.

Pulverized tire rubber powder in the size range of 80-120 µm was obtained from Lehigh Technologies, Inc., Georgia. The tire rubber powders were soaked in a concentrated sulfuric acid bath (kept at 110° C. for overnight) to yield the sulfonated tire rubber that was then washed and filtered off. The washed sulfonated tire rubber was then pyrolyzed at 1100° C., 1400° C., and 1600° C., respectively, in a tube furnace under flowing nitrogen gas, and they are hereafter designated as TC1100, TC1400, and TC1600.

The X-ray diffraction (XRD) data were collected with a PANalytical Empyrean diffractometer equipped with Cu Kα radiation (λ=1.5406 Å). Nitrogen adsorption desorption isotherms were obtained with a Quantachrome NovaWin1000 surface area & porosity analyzer at 77.4° K. The specific surface area was determined by the Brunauer-Emmett-Teller (BET) method. The pore size distribution was obtained by the Barret-Joyner-Halenda (BJH) method. Raman spectra were collected with a Horiba LabRam HR using an excitation wavelength of 473 nm, a 600 gr/mm grating and an 800 mm monochromator. A Zeiss Merlin VP scanning electron microscope (SEM) operated at 3 kV was used to characterize the surface morphologies of the samples. Interlayer distances of the carbons were determined by a Hitachi HD-2300A scanning transmission electron microscope (STEM) with a field emission source operated at 200 kV in bright-field imaging mode at a 2.1 Å resolution. XPS data were collected with a Thermo-Fisher K-alpha XPS with a monochromatic Al-$K_{alpha}$, a 1486.6 eV source, 400 µm spot, and an argon ion flood gun.

Electrochemical properties were characterized with half cells against a sodium-metal electrode. The working electrode was prepared by spreading the mixed slurry consisting of the active material, conductive carbon C45 and PVDF binder in N-methyl-2-pyrrolidone (NMP) solvent at a weight ratio of 80:10:10. The resulting slurry was then cast onto a copper foil current collector and transferred to a vacuum oven for drying at 120° C. overnight. The typical loading amount of active material was 2 to 2.5 mg $cm^{-2}$. The electrolyte was a solution of 1 M $NaClO_4$ in ethylene carbonate (EC) and diethyl carbonate (DEC) (1:1 in vol). Coin cells (CR2032) consisting of the tire-derived carbon electrode, glass fiber, a sodium metal counter electrode and electrolyte were assembled in an Ar-filled glove box. Galvanostatic charge/discharge was carried out on a Land CT2001 battery test system (Wuhan, China) over a voltage range of 0-3 V at current density of 20 mA $g^{-1}$ at room temperature. The sodiated electrodes were disassembled in an Ar-filled glovebox and placed in an air-sensitive sample holder for further characterizations. The ex situ XRD analysis was performed on a Rigaku Miniflex600 diffractometer with Cu Kα radiation.

As shown in FIG. 12A, XRD collected on bulk materials indicate that the tire-derived carbons pyrolyzed at different temperatures are mainly composed of poorly crystalline carbonaceous material. The broad peak near 2θ~26.6° suggests lack of significant order in the bulk of the carbon materials and this peak is related to the (002) plane. The R value for TC1100, TC1400, and TC1600 are 1.58, 2.27 and 2.67, respectively. Here, R is defined as the peak height divided by the background height at the position of the peak. The value of R can be used to estimate the fraction of graphene sheets, which increases as the proportion of the graphene layers with parallel neighbors increases. TC1600 shows the largest graphene fraction by the comparing three R values. Raman spectra obtained on tailored carbons are shown in FIG. 12B. The ID/IG ratio for TC1100, TC1400, and TC16000 increases from 0.85 to 0.96 to 0.99. Such a trend has also been reported for hard carbon material obtained from other precursors. The ID/IG ratio changes differently in a three-stage model of increasing disorder. The G peak is due to the bond stretching of all pairs of sp2 atoms in both rings and chains. The D peak is due to the breathing modes of sp2 atoms in the rings. The ratio of ID/IG is proportional to the number of aromatic rings. The increased relationship in the ID/IG ratio and G band position for the tire-derived carbons shows that more sp2 amorphous carbon turns into nanocrystalline graphite at higher temperatures. This tendency can also be concluded and confirmed by the R values.

From the nitrogen adsorption-desorption plots for the sulfonated tire rubber-derived carbons, the BET surface areas for TC1100, TC1400, and TC1600 are determined to be 189, 210 and 148 $m^2 g^{-1}$, respectively. The pore volume distribution shows a relatively wide pore size distribution with prominent microporosity with a pore width of less than 2 nm and a noticeable volume fraction of pore widths in the range of 6-8 nm. The dominant microporosity could be attributed to the fact that the sulfuric acid pretreated tire powder produces $SO_2$ and steam which yields activated tire-derived carbon. The SEM images of different temperature treated tire-derived carbons exhibit similar surface porosity properties. SEM images of TC1400 show a large number of macro- and meso-pores are visible on the sample surface. From the high resolution scanning transmission electron microscopy (STEM) images of sulfonated tire-derived carbon treated at 1100° C., 1400° C. and 1600° C., the interlayer distances for crystalline areas were determined to be 4.7 Å, 4.5 Å, and 4.0 Å for TC1100, TC1400 and TC1600, respectively. These values are larger than the required distance (0.37 nm) for sodium intercalation and follow the general trend that the carbon interlayer distance decreases with increasing pyrolysis temperatures. The selected area electron diffraction (SAED) patterns of the three temperature treated carbon indicate that the amorphous phase dominates. It is also clear that the TC1600 carbon has more crystalline phases compared to the lower temperature pyrolyzed carbon.

Figure 13A:
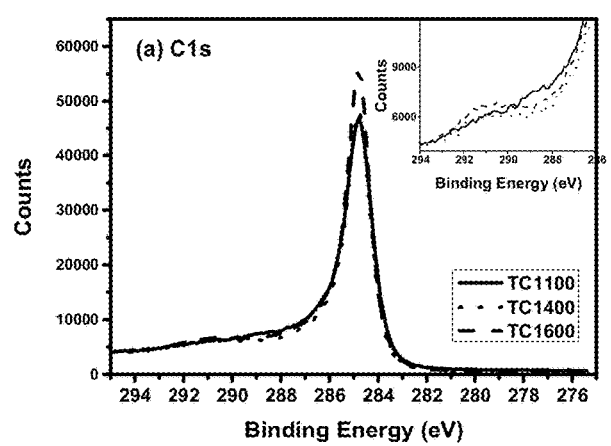
FIGS. 13A and 13B are X-ray photoemission spectroscopy (XPS) of sulfonated tire rubber-derived carbons showing FIG. 13A C1s scans and FIG. 13B S2p scans. The insert in FIG. 13A shows the expanded binding energy plots.
Figure 13B:
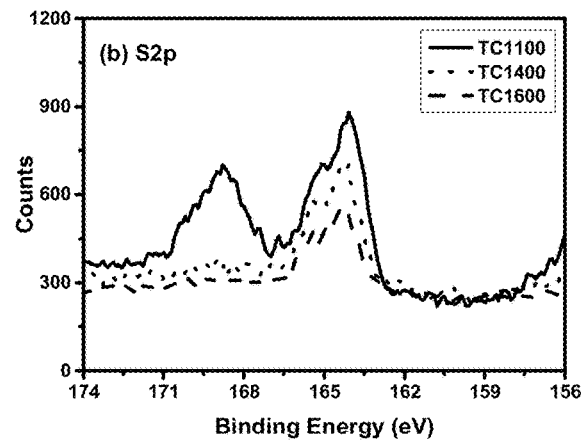

X-ray photoemission spectroscopy (XPS) data on the tire-derived carbons are shown in FIG. 13. The C1s spectrum in FIG. 13A for the samples shows a sharp peck at 284.8 eV, which is due to the $sp^2$ configuration. The fitting results for C1s spectrum also show small amounts of C—O, C=O, and aromatic C functional groups on the surface. The small peak at around 291 eV could be related to the presence of aromatic rings in the materials and as shown in the inset that its relative intensity increases with the pyrolysis temperatures. This result also confirms the conclusion by Raman spectra that more aromatic rings are present in the higher temperature samples. FIG. 13B shows the S2p scans of the samples. The doublets at about 164 eV are related to the thiol group and the peak at 169 eV is due to the sulfate group. It is shown that as the temperature increases, sulfate groups are removed from the samples. The XPS elemental analysis for the samples is shown in Table 1. The impurities of Si and Fe could be due to the additives or impurities present in the tire powders. It is clear that the purity improves as the pyrolysis temperature increases since more functional groups are eliminated at higher temperatures.

TABLE 1

XPS surface concenartion (in atomic percentages) of TC1100, TC1400 and TC1600.
XPS Elemental Analysis (% Surface Atomic Composition)

| Sample | Si | S | C | O | Fe |
|---|---|---|---|---|---|
| TC1100 | 1.5 | 1.1 | 82.1 | 14.8 | 1.52 |
| TC1400 | 0.9 | 0.6 | 92.6 | 4.4 | — |
| TC1600 | 0.5 | 0.5 | 95.5 | 3.6 | — |

The electrochemical performances of tire-derived carbons were evaluated in sodium half cells. FIG. 14 A-C show the cycling stability of the three samples tested under a current density of 20 mA $g^{-1}$. TC1100 provides an initial capacity of 520 mAh $g^{-1}$ for discharge and 250 mAh $g^{-1}$ during charge, which corresponds to only 48% coulombic efficiency for the first cycle in FIG. 14A. The large irreversible capacity loss could be associated with the high surface area of the carbon material and the reduction of carbon surface functional groups followed by electrolyte decomposition and formation of solid electrolyte interphase (SEI). Surface coating techniques could be used in the future to reduce the surface area and to improve the efficiency. After the 10th cycle, the coulombic efficiency increases to above 99% and the capacity becomes stabilized. The capacity at the 100th cycle was 179.4. Compared to TC1100, the cycling results for TC1400 and TC1600 in FIG. 14B and FIG. 14C show improvements in first cycle efficiency and capacity. TC1400 exhibits 57% first cycle efficiency and a capacity of 185 mAh $g^{-1}$ after 100 cycles whereas TC1600 shows further enhancement of the first cycle efficiency to 66% and a capacity of 203 mAh $g^{-1}$ at 100th cycle. The improved cycling performance may be related to the reduced number of surface functional groups and also reduced amount of defects in the carbon after the higher temperature treatment.

FIG. 14D presents the electrochemical voltage profiles when sodium is intercalated and deintercalated from the various tire-derived carbons. It can be seen that the TC1100 voltage profile mostly consists of the sloping region during cycling. However, both the TC1400 and TC1600 charge and discharge curves can be divided into two regions, a sloping voltage region extending down to 0.2 V and a large portion of the plateau region. Similar voltage profiles of other high temperature treated carbon materials for sodium-ion batteries have also been reported previously. The observed charge capacity of the plateau region for TC1400 is 165 mAh $g^{-1}$, which is approximately 65% of the whole capacity. For TC1600, the plateau capacity increases to 197 mAh $g^{-1}$, accounting for 71% of the total capacity. In carbon materials, the disordered graphene layers are randomly distributed and can be modeled like a "house of cards". The sloping region of the potential profile corresponds to the insertion of sodium between the turbostratically disordered graphene layers and the low-potential plateau region can be attributed to the insertion of the metal into the nanopores between randomly stacked layers through a process analogous to adsorption. When sodium is intercalating into graphene inter-layers continuously, the overall potential decreases as the insertion of metal ions between layers changes the potential for further insertion and turbostratic stacking between the parallel sheets gives rise to a distribution of insertion-site potentials. The Na chemical potential of the following step in the pore filling is close to that of the elemental sodium metal, which shows a voltage plateau close to 0 V. The improved performance of tire-derived carbon at higher firing temperature suggests that more nano-crystalline graphene layers are created and these randomly stacked layers generate more voids for sodium storage at an elevated temperature.

Figure 15:
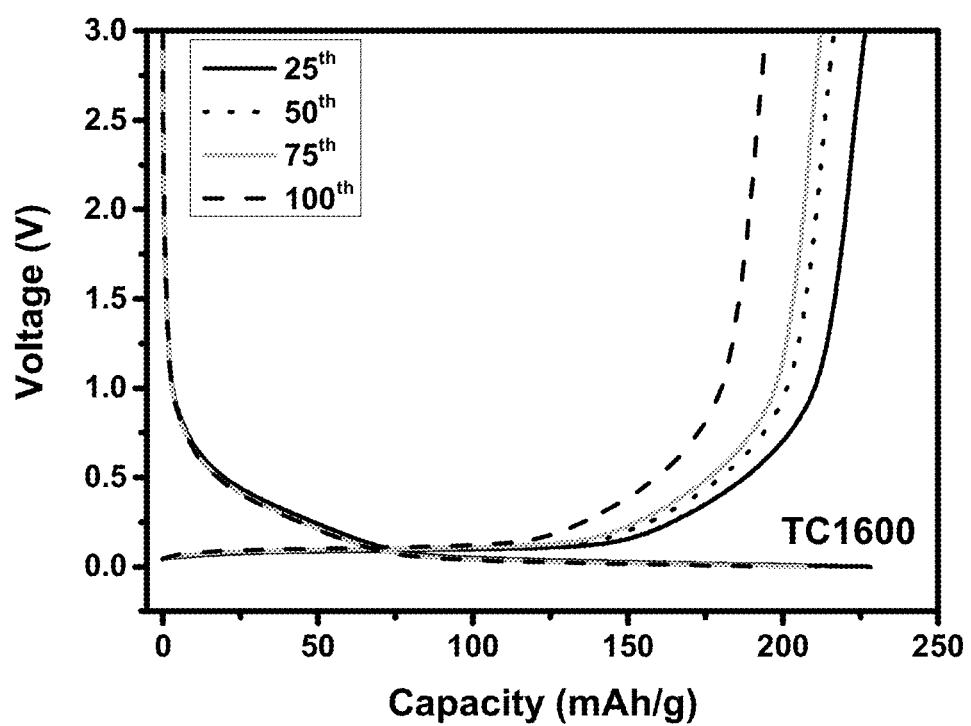
FIG. 15 is a comparison of the discharge and charge curves of TC1600 at 25th, 50th, 75th, and 100th cycles.

A comparison of the discharge and charge curves of TC1600 at different cycles is shown in FIG. 15. The plot shows that the capacity decreases with cycling. However, by comparing the discharge capacity profile, it is interesting to reveal that the sloping region is almost constant while the plateau region is reduced dramatically. This rapid plateau region decay indicates the sodium adsorption-desorption in the nanopores at the low-potential region and hence capacity fades and the Na plating into nanopores is not fully reversible or has poor kinetic properties.

Ex-situ XRD measurements show for the pristine electrode, the (002) peak centered at 25.7° and as sodium intercalates into the carbon electrode, the (002) peak shifts slightly to 25.5°, 25.4° and 25.1° for electrodes discharged to and disassembled at 1.0 V, 0.8 V and 0.2 V, respectively. Such peak shifts to lower angle indicates an increase in d-values due to sodium insertion between the parallel graphene layers and an expansion of the interlayer spacing.

The discharge voltage profiles for all carbon samples at different current densities reveal that TC1400 and TC1600 have a larger portion of the low-voltage plateau, which is caused by pore plating of sodium metal. This plateau rapidly disappears as the current density increases. TC1100 does not have a plateau and delivers a larger capacity at higher current density. These results indicate that the pore plating process will be slower and needs more time to reach equilibrium than the sodium insertion into disordered graphene layers. To further improve the high rate capability, electrode materials conductivity could be improved with a surface coating process.

Figure 16:
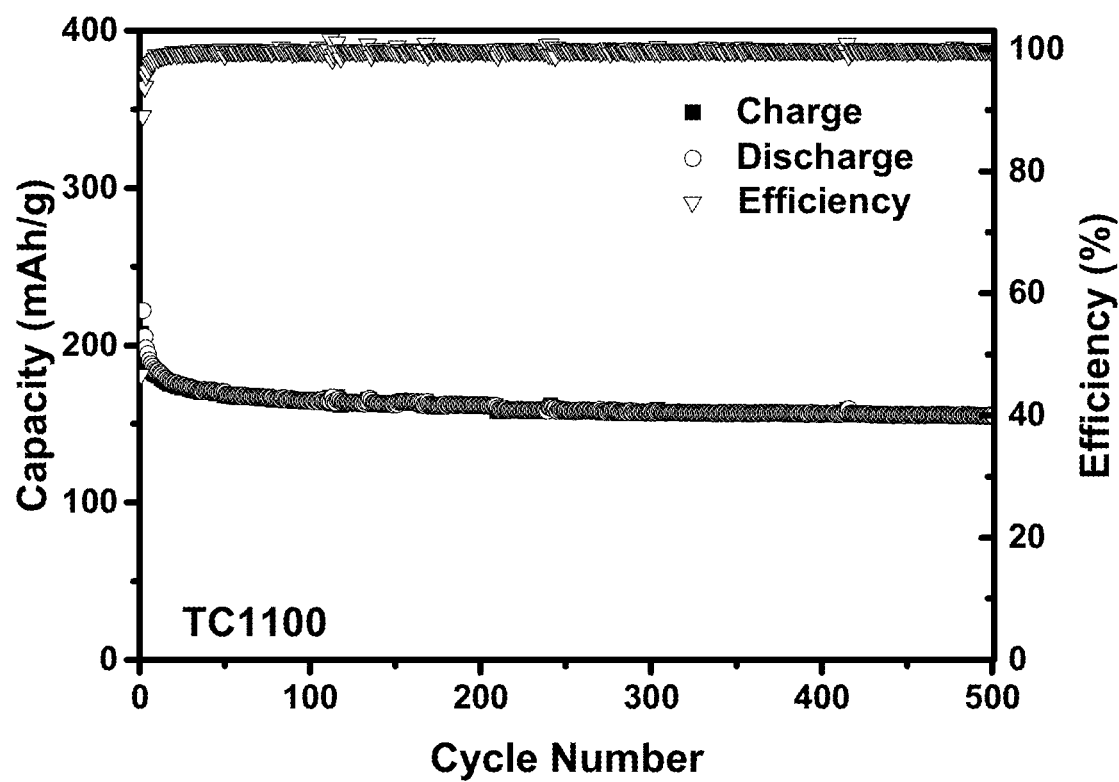
FIG. 16 is the long-cycle stability test of TC1100 at a current density of 20 mA $g^{-1}$.

The long-term stability test was conducted for TC1100 in 1M $NaClO_4$ in propylene carbonate (PC) as the electrolyte, as shown in FIG. 16. Good cyclability performance proves that the materials could also work in other electrolytes, such as PC based systems, which can be operated at lower temperature than ethylene carbonate (EC) based electrolytes. TC1100 shows a capacity of 156 mAh $g^{-1}$ after 500 cycles at a current density of 20 mA $g^{-1}$.

The invention provides for the use of solid-waste-tire-derived carbons as anodes for sodium-ion batteries. When the pyrolysis temperature is increased from 1100 to 1600° C., the capacity of the plateau below 0.2 V increases dramatically and this could help increase the full cell energy density. The 1600° C. treated carbon shows a capacity of 203 mAh $g^{-1}$ after 100 cycles. These tire-derived carbons demonstrate a low-cost, easily scalable option with good electrochemical capacity and stability for sodium-ion battery anodes.

This invention can be embodied in other forms without departing from the spirit or essential attributes thereof. Reference should be made to the following claims to determine the scope of the invention

We claim:

1. A method of making a battery electrode comprising carbon black, the method comprising the steps of:
   providing a non-graphitic, tire-derived carbon composite material comprising a carbonaceous source material and carbon black embedded within the carbonaceous source material;
   contacting the carbonaceous source material with an oleum bath having a temperature of from 100 to 200° C. to produce a sulfonated material;
   pyrolyzing the sulfonated material at a temperature of from 1100 to 1400° C. to produce a layered carbon black containing product comprising a glassy carbon matrix phase having carbon black dispersed therein, the layered carbon black containing product having an interlayer spacing of from 4 to 5 angstroms; and,
   forming a battery electrode from the carbon black containing product.

2. The method of claim 1, wherein the battery electrode is an anode.

3. The method of claim 2, wherein the battery is a lithium ion or a sodium ion battery.

4. The method of claim 1, wherein the battery is a lithium ion battery or a sodium ion battery.

5. The method of claim 1, wherein pyrolysis step is conducted at a temperature that is greater than 1200° C.

6. The method of claim 1, wherein the pyrolysis step is conducted at a temperature from 1200-1400° C.

7. The method of claim 1, wherein pyrolysis step is conducted at a temperature from 1250-1350° C.

8. The method of claim 1, wherein the carbon black containing product comprises pores with an average pore size of between 2 and 120 nm.

9. A method of making a battery electrode comprising carbon black, the method comprising the steps of:
   providing a tire-derived carbon composite material comprising a carbonaceous source material and carbon black embedded within the carbonaceous source material;
   contacting the carbonaceous source material with an oleum bath having a temperature of from 100 to 200° C. to produce a sulfonated material;
   pyrolyzing the sulfonated material at a temperature of from 1100 to 1400° C. to produce a layered carbon black containing product comprising a glassy carbon matrix phase having carbon black dispersed therein, the layered carbon black containing product having an interlayer spacing of from 4 to 5 angstroms; and,
   forming a battery electrode from the carbon black containing product.

\* \* \* \* \*